United States Patent [19]
Minami

[11] Patent Number: 5,631,817
[45] Date of Patent: May 20, 1997

[54] LOAD CURRENT CONTROL OF PULSE WIDTH MODULATED DRIVE SIGNAL INCLUDING CALIBRATION AND CORRECTION COEFFICIENT

[75] Inventor: Akira Minami, Kawasaki, Japan

[73] Assignee: Fujitsu Limited, Japan

[21] Appl. No.: 424,130

[22] Filed: Apr. 19, 1995

[30] Foreign Application Priority Data

Jun. 13, 1994 [JP] Japan ................... 6-130071

[51] Int. Cl.[6] ................. H02M 3/24; H02M 5/42
[52] U.S. Cl. ...................... 363/98; 363/41
[58] Field of Search ................. 363/41, 49, 98

[56] References Cited

U.S. PATENT DOCUMENTS

| | | | |
|---|---|---|---|
| 4,455,520 | 6/1984 | Ward et al. | 318/696 |
| 4,757,241 | 7/1988 | Young | 318/254 |
| 5,436,545 | 7/1995 | Bahr et al. | 318/727 |
| 5,450,306 | 9/1995 | Garces et al. | 363/98 |
| 5,526,252 | 6/1996 | Erdman | 363/41 |

FOREIGN PATENT DOCUMENTS

| | | |
|---|---|---|
| 60-190166 | 9/1985 | Japan . |
| 3-034590 | 2/1991 | Japan . |
| 4-071384 | 3/1992 | Japan . |
| 4-156705 | 5/1992 | Japan . |
| 4-255491 | 9/1992 | Japan . |
| 7-007987 | 1/1995 | Japan . |

*Primary Examiner*—Stuart N. Hecker
*Attorney, Agent, or Firm*—Greer, Burns & Crain, Ltd.

[57] ABSTRACT

A PWM pulse of a duty ratio according to a current instruction value D of a servo control section is outputted from a pulse width modulating section to a driving section, thereby current driving a load. In a calibrating process, a calibration processing section outputs a reference current instruction value Dr corresponding to a reference load current Ir and measures a drive current Is of a load. When the measurement current Is doesn't coincide with the reference load current Ir, the current instruction value is adjusted, a current instruction value Ds of the measurement current Is which coincides with the reference load current Ir is obtained, and a correction coefficient K=Ds/Dr of the current instruction value is decided. A correcting section corrects the current instruction value D which is outputted from a control section by the correction coefficient K obtained by the calibrating section and outputs to the pulse width modulating section.

17 Claims, 18 Drawing Sheets

TO UPPER PROCESSOR

FIG. 8A CLOCK E3

FIG. 8B COMPARING OPERATION

FIG. 8C PWM PULSE

FIG. 8D PWM PULSE

FIG. 8E PWM PULSE

FIG. 10A CLOCK SIGNAL E7
FIG. 10B COINCIDENCE JUDGING OPERATION
FIG. 10C PWM PULSE
FIG. 10D PWM PULSE
FIG. 10E PWM PULSE

LOAD CURRENT CONTROL OF PULSE WIDTH MODULATED DRIVE SIGNAL INCLUDING CALIBRATION AND CORRECTION COEFFICIENT

BACKGROUND OF THE INVENTION

The invention relates to a driving apparatus and a driving method of an actuator which is used in an optical disk apparatus, a compact disk apparatus, or the like and, more particularly, to a driving apparatus and a driving method using a pulse width modulation for forming a pulse signal of a duty ratio according to instruction data and driving a load.

Recently, although the optical disk apparatus, compact disk apparatus, and the like have been developed, various serve mechanisms are used in those apparatuses. For example, the optical disk apparatus using a rewritable magnetooptic medium includes: a focusing servo mechanism for allowing a laser beam to trace a surface oscillation of the disk medium; a tracking servo mechanism for correcting an eccentricity and allowing the laser beam to trace a guide groove for recording and reproducing; a carriage control mechanism for seeking an optical head to a recording and reproducing track of the disk medium; an external magnetic field control mechanism for rotating and moving a permanent magnet to give an external bias magnetic field upon erasing or recording of data or switching a polarity of an electromagnet; further, a loading/ejecting control mechanism for loading and ejecting a recording medium enclosed in a cartridge; and the like.

As such an actuator of the servo mechanism, an inductive load such as a motor, a solenoid coil, or the like is used. For example, by supplying a current to the solenoid coil, a mechanical motion such as linear movement, rotational movement, or the like is obtained. To drive the actuators for the motor, the solenoid coil, and the like, a power amplifying circuit using a power amplifier is used. The power amplifying circuit can be classified into a voltage driving type, a current driving type, or a pulse width modulation (PWM) driving type.

FIG. 1 shows a power amplifying circuit of the conventional voltage driving type. A non-inverting amplifier 206 using an operational amplifier, an inverting amplifier 208, resistors R1 and R2 are provided for a power amplifying circuit 204 of the voltage driving type. Output terminals of the amplifiers are connected to both ends of an actuator coil 210. Current instruction data from a servo circuit section 200 is converted to a control voltage by a D/A converter 202. The control voltage is inputted to the non-inverting amplifier 206 and the inverting amplifier 208. When the input voltage has a plus polarity when it is seen from a potential at a center point, a drive current shown by a solid line 212 is supplied from the non-inverting amplifier 206 to the inverting amplifier 208 through the actuator coil 210, thereby driving the actuator in the forward direction. When the input voltage has a minus polarity as it is seen from the potential at the center point, a drive current shown by a broken line 214 is supplied from the inverting amplifier 208 to the non-inverting amplifier 206 through the actuator coil 210, thereby driving the actuator in the reverse direction.

FIG. 2 shows a power amplifying circuit of the conventional current driving type. An inverting amplifier 218 using an operational amplifier, an inverting amplifier 220, and resistors R3 to R9 are provided for a power amplifying circuit 216 of the current driving type. Output terminals of the amplifiers are connected to both ends of the actuator coil 210. The resistor R9 is a current detection resistor of small resistance value that detects a current flowing in the actuator coil 210. A detection voltage of a load current by the resistor R9 is fed back to the inverting amplifier 218 and to the inverting amplifier 220. The load current is a constant current controlled so that the detection voltage coincides with the conversion voltage from the D/A converter 202. Thus, a constant current corresponding to current instruction data of the servo circuit section 200 is obtained.

FIG. 3 shows a power amplifying circuit of the conventional pulse width modulation driving type. A pulse width modulating (PWM) circuit 222 is used in combination with a bridge type driver 224. Current instruction data from the servo circuit section 200 is inputted to the PWM circuit 222. The PWM circuit 222 generates a pulse signal having a duty ratio according to the current instruction voltage. Specifically speaking, the PWM circuit 222 generates a forward direction PWM signal E101, a reverse direction PWM signal E102, and an enable signal E100. The bridge type driver 224 bridge couples FETs 228, 230, 232, and 234. The actuator coil 210 is connected between the FETs 228 and 232 and the FETs 230 and 234. When the forward direction PWM signal E101 is supplied in a state in which the enable signal E100 is valid, the FETs 228 and 234 are on/off controlled and a current in the forward direction shown by the solid line 212 flows in the actuator coil 210. When the reverse direction PWM signal E102 is supplied in a state in which the enable signal E100 is valid, the FETs 230 and 232 are on/off controlled and a current in the reverse direction shown by the broken line 214 flows in the actuator coil 210.

However, in the power amplifying circuit of the voltage driving type of FIG. 1, although the circuit construction is simple, a resistance value of a coil load changes in accordance with a temperature change. There is, consequently, a fear that the load current fluctuates and that the servo gain changes and also that a servo deviation or an oscillation of a servo system occurs. Similarly, there is also a problem such that even for fluctuation of power source voltage, the load current changes and the servo gain changes. According to the power amplifying circuit of the current driving type of FIG. 2, although a high precision is obtained by constant current control even when there are temperature change and power source fluctuation, circuit construction is complicated by only an amount of circuits for detecting the load current and feedback controlling. Particularly, in the case where a number of servo mechanisms are provided, the whole circuit scale increases.

Further, according to the power amplifying circuit of the pulse width modulation driving type of FIG. 3, electric power consumption is reduced owing to a duty control using an accumulating function of energy which the inductive coil load has, so that high efficiency is obtained. However, since the pulse width modulation driving type is fundamentally a voltage driving type, the servo gain fluctuates due to fluctuation of the load current by the resistance change of the coil load depending on the temperature and fluctuation of the load current in association with fluctuation in the power source voltage, so that servo deviation, oscillation of the servo system, or the like occurs.

A circuit of the PWM driving type having a function that is substantially equivalent to the current driving type for detecting a load current and for feedback controlling the load current by adjusting a duty ratio is also considered. However, since an A/D converter, an analog comparator, and the like for feedback controlling the current are necessary in addition to the pulse width modulating circuit, circuit construction is complicated. Particularly, in the case where a number of servo mechanisms are provided, the whole circuit scale increases.

Further, in the optical disk apparatus or the like, in order to control the number of servo mechanisms, digital signal processors (DSP) have recently been used. According to the digital signal processor, an analog signal which was detected by a sensor or the like and inputted from an outside is converted to a digital signal and supplied to the processor. Servo control data (current instruction data) is formed by an arithmetic operating process by a program control, and the servo control data is converted to an analog signal or pulse width modulation signal, thereby driving a coil load. Such a process can be also executed by a high speed microprocessor in place of a digital signal processor (DSP) 236. In the subsequent description, it is assumed that a high speed microprocessor can also be used in place of the digital signal processor 236.

As shown in FIG. 4, hitherto, A/D converters 244 and D/A converters 248 and, further, PWM output circuits 246 for generating pulse width modulation signals are ordinarily provided for the digital signal processor 236 as standard specifications in addition to a CPU 238, an ROM 240, and an RAM 242. Among them, the area which is occupied in an LSI chip by the digital signal processor of the PWM output circuit 246 is small and cost performance of the circuit is high. Therefore, it can be said that a construction in which the bridge type driver 224 is combined with the digital signal processor 236 installed with the PWM output circuit as a standard specification and is used for a servo control of the optical disk apparatus is an effective form from viewpoints of the simplification of the circuit, decrease in costs, improvement of the precision, and the like. However, the PWM output circuit 246 installed as a standard specification in the DSP 236 is also fundamentally the voltage driving type. Servo gain fluctuations due to fluctuations in load current (from either a resistance change in the coil load, which depends on temperature, or fluctuations in load current in association with fluctuations in the power source voltage) result in servo deviation, an oscillation of the servo system, or the like. Therefore, a method of providing a function that is substantially equivalent to the current driving type for detecting load current and for feedback controlling the load current by adjusting the duty ratio is also considered. However, an A/D converter, an analog comparator, and the like are necessary and the circuit is complicated.

Therefore, it is difficult to build all of the circuits including a driver into the LSI chip of the digital signal processor 236. A discrete circuit is also necessary between the DSP 236 and the bridge type driver 224, and there is a problem such that an advantage that will be obtained by using the digital signal processor cannot be sufficiently effected.

SUMMARY OF THE INVENTION

According to the invention, there are provided a driving apparatus and a driving method using a pulse width control in which control precision that is almost equal to that of a current driving type can be realized by a simple externally attached circuit, even in a processor having therein a pulse width modulating circuit of a voltage driving type.

The invention relates to a driving apparatus for current driving a load by forming a pulse signal of a duty ratio according to a current instruction value D inputted from a servo control section by a pulse width modulating section and by outputting the pulse signal to a driving section. With respect to such a driving apparatus, the invention is characterized in that a measurement adjusting section and a correcting section are provided. When an instruction for a calibrating process is received, the measurement adjusting section outputs a reference current instruction value Dr corresponding to a predetermined reference load current Ir to the pulse width modulating section and measures a drive current Is of a load. When the measurement current Is does not coincide with the reference load current Ir, the current instruction value for the pulse width modulating section is adjusted. When a current instruction value Ds indicative of the measurement current Is which coincides with the reference load current Ir is obtained by such an adjustment, a correction coefficient K of the current instruction value is determined from the measurement result. The correction coefficient K is a value obtained by dividing the measurement current instruction value Ds by the reference current instruction value Dr.

The correcting section corrects a current instruction value D that is outputted from the control section by the correction coefficient K obtained by the calibrating section and outputs to the pulse width modulating section. Namely, a current instruction value (K·D) is obtained by multiplying the correction coefficient K by the current instruction value D, and is outputted to the pulse width modulating section.

The servo control section, pulse width modulating section, calibrating section, and correcting section are realized by a processor. The processor includes: a digital signal processor having therein at least an A/D converter and a D/A converter; and a one-chip microprocessor having therein at least an A/D converter and a D/A converter. The processor is, for example, a digital signal processor and comprises: a pulse width modulation output section corresponding to the pulse width modulating section; a central processing unit for realizing each of the servo control section, calibrating section, and correcting section by a program control; and an A/D converting unit for fetching a detection value of the load current to the central processing unit.

The digital signal processor has therein: a central processing unit for realizing each of the servo control section, calibrating section, and correcting section by a program control; and an A/D converting unit for fetching a detection value of the load current to the central processing unit. On the other hand, the pulse width modulating section constructing the pulse width modulating section is provided as an external circuit.

In case of driving a plurality of loads, the digital signal processor has therein: pulse width modulation output sections of the number corresponding to a plurality of loads; and an A/D converting section for converting a detection value of the load current to a digital signal. In case of driving a plurality of loads, the digital signal processor can be also constructed in a manner such that one of detection values of a plurality of load currents is selected by a selecting section (multiplexer) and is converted to a digital signal by a single A/D converter and a calibrating process is executed while selecting the load current by the selecting section.

According to the invention, an initializing section for instructing the calibrating section to execute measuring and adjusting processes when a power source of the apparatus is turned on is provided. A scheduling section such as a timer or the like for periodically instructing the calibrating section to execute the measuring and adjusting processes can also be provided. Further, a temperature measuring section to measure an environmental temperature of the apparatus is provided and when an instruction to execute a calibrating process is received, the calibrating section compares the detection temperature from a temperature detecting section with the previous detection temperature and executes the calibrating process when a temperature difference exceeding a predetermined value is judged.

According to such a driving apparatus using the pulse width control of the invention, even in load driving using a pulse width modulating circuit that is almost equivalent to the current driving type, which load current flows for a specified current instruction value is measured periodically and when the power source is turned on. When the measured load current is out of the specified current value, the current instruction value is adjusted so as to obtain the specified current value. By such an adjustment, an instruction current value at which the specified load current is actually obtained can be measured.

A correction coefficient to adjust the servo gain which was fluctuated by a temperature or power source fluctuation to a correct value can be calculated from the measurement result. In the ordinary servo control, by controlling a duty ratio by using the instruction current value corrected by multiplying the correction coefficient to the current instruction value for the load, load driving by pulse modulation in which the servo gain due to the power source fluctuation or temperature change is assured can be performed. When using the digital signal processor having therein the pulse width modulating circuit and the A/D converter, a control of a high precision that is almost equivalent to the constant current driving type can be realized by a simple circuit construction such that a detection resistor of the load current is externally attached and the detection voltage is connected to an input terminal of the A/D converter.

When driving a plurality of loads, by using a digital signal processor having therein an A/D converter with a multiplexer, each load current is selectively A/D converted and the calibrating process can be performed. Even in such a case, it is sufficient to use only a current detection resistor as an externally attached circuit. Consequently, a load driving apparatus in which both low costs and a high precision are accomplished can be realized.

The above and other objects, features, and advantages of the present invention will become more apparent from the following detailed description with reference to the drawings.

DETAILED DESCRIPTION OF THE PREFERRED EMBODIMENTS

Figure 5:
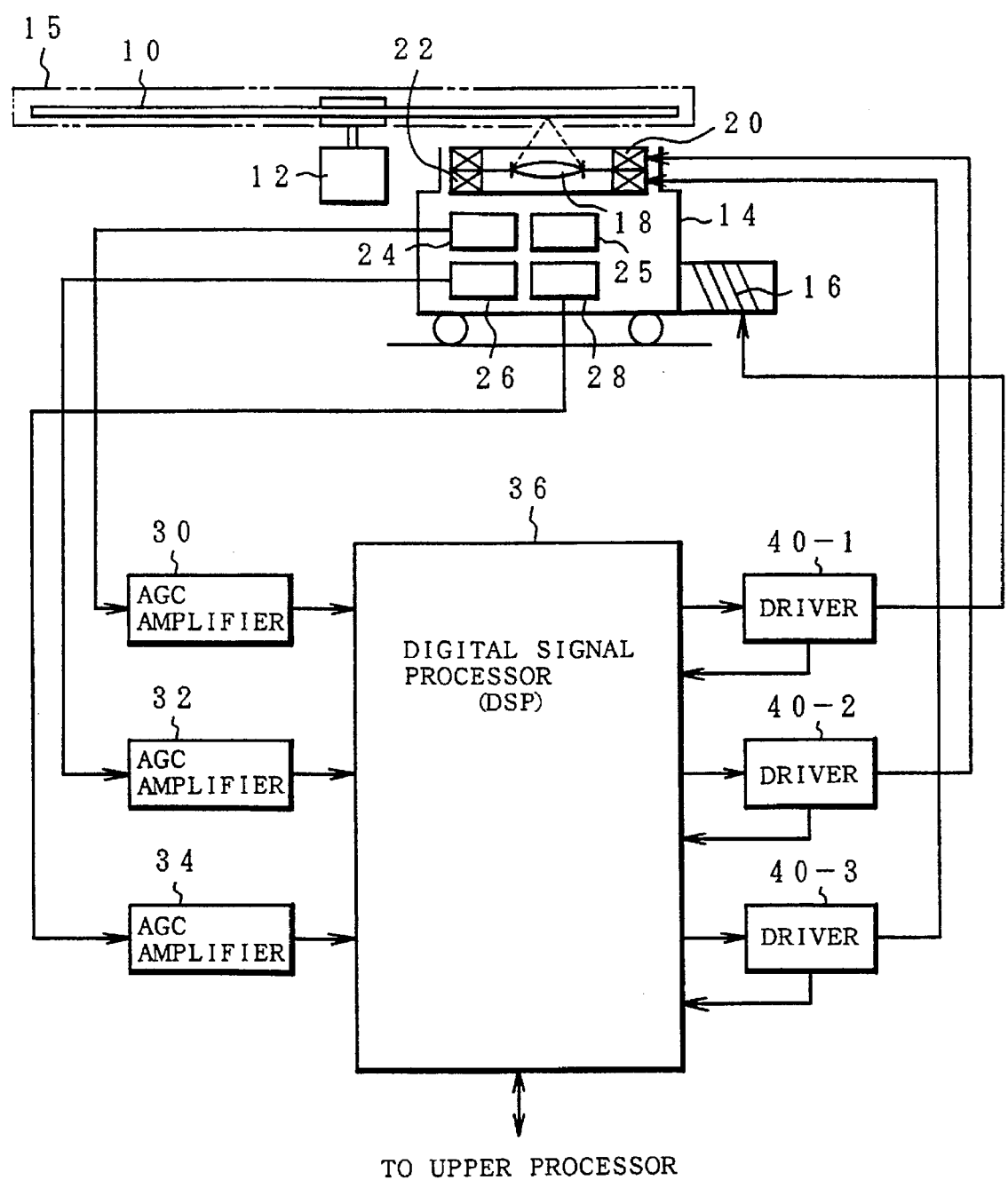
FIG. 5 is a block diagram of an optical disk apparatus to which the invention is applied.

FIG. 5 is a block diagram of an optical disk apparatus to which a driving method of the present invention is applied. An optical disk 10 as a recording medium is attached to a rotary axis of a spindle motor 12 and is rotated. A readable/writable magnetooptic disk is used as an optical disk 10. The magnetooptic disk 10 is enclosed in a cartridge 15, and can be attached or detached to/from the rotary axis of the spindle motor 12 by a loading/unloading mechanism (not shown). An optical head section 14 is provided for the optical disk 10. The optical head section 14 is provided so as to be movable in the radial direction of a recording medium surface of the optical disk 10 by a voice coil motor (VCM) 16. An objective lens 18 is installed in the optical head 14 and a laser beam is irradiated onto the medium surface of the optical disk 10. As a laser beam by the objective lens 18, a write beam modulated by a data bit is irradiated in a writing operation. In a reading operation, a read beam is irradiated. Further, in an erasing operation, an erase beam is irradiated. A tracking coil 20 and a focusing coil 22 are provided for the objective lens 18. The tracking coil 20 drives the objective lens 18 so as to move a beam spot on the medium surface of the optical disk 10 in a micro range in the radial direction. The focusing coil 22 moves the laser beam spot by a micro distance in the direction of an optical axis so as to form an image onto the medium surface of the optical disk 10. A position of the objective lens 18 is detected by a lens position detector 24. A reflected light of the laser beam irradiated to the medium surface of the optical disk 18 through the objective lens 18 is formed as an image onto a 2-split photodetector 26 and, for example, via a Foucault unit 25, to a 4-split photodetector 28. A detection signal of the lens position detector 24 is given to an AGC amplifier 30. The AGC amplifier 30 generates a lens position detection signal which linearly changes so as to have no polarity (0) at a neutral position of the objective lens 18 or a plus or minus polarity in accordance with a moving direction by the tracking coil 20. A light reception signal of the 2-split photodetector 26 is supplied to an AGC amplifier 32 and a tracking error signal is detected. A light reception signal of the 4-split photodetector 28 is an output signal according to an out-of focus of the medium surface by the Foucault unit 25 and is supplied to an AGC amplifier 34, so that a focusing error signal is formed.

In a digital signal processor (DSP) 36, the voice coil motor 16 provided for the optical head section 14 and the servo control section of the tracking coil 20 and focusing coil 22 are realized by a program control. Drive signals by the servo control sections which are realized by the digital signal processor 36 are respectively supplied to bridge type drivers 40-1, 40-2, and 40-3. The bridge type driver 40-1 drives the voice coil motor 16, thereby moving the optical head section 14 in the radial direction of the optical disk 10. The bridge type driver 40-2 drives the tracking coil 20, thereby allowing the laser beam to trace a track on the medium surface of the optical disk 10 by the objective lens 18. Further, the bridge type driver 40-3 drives the focusing coil 22, thereby performing an automatic focusing control of the objective lens 18 so as to form an image onto the medium surface of the optical disk 10. The DSP 36 mainly realizes a function as a servo control section. The reading operation and writing operation in the optical disk apparatus and, further, the transmission and reception of signals to/from an external upper control unit are executed by an upper processor provided separately.

Figure 6:
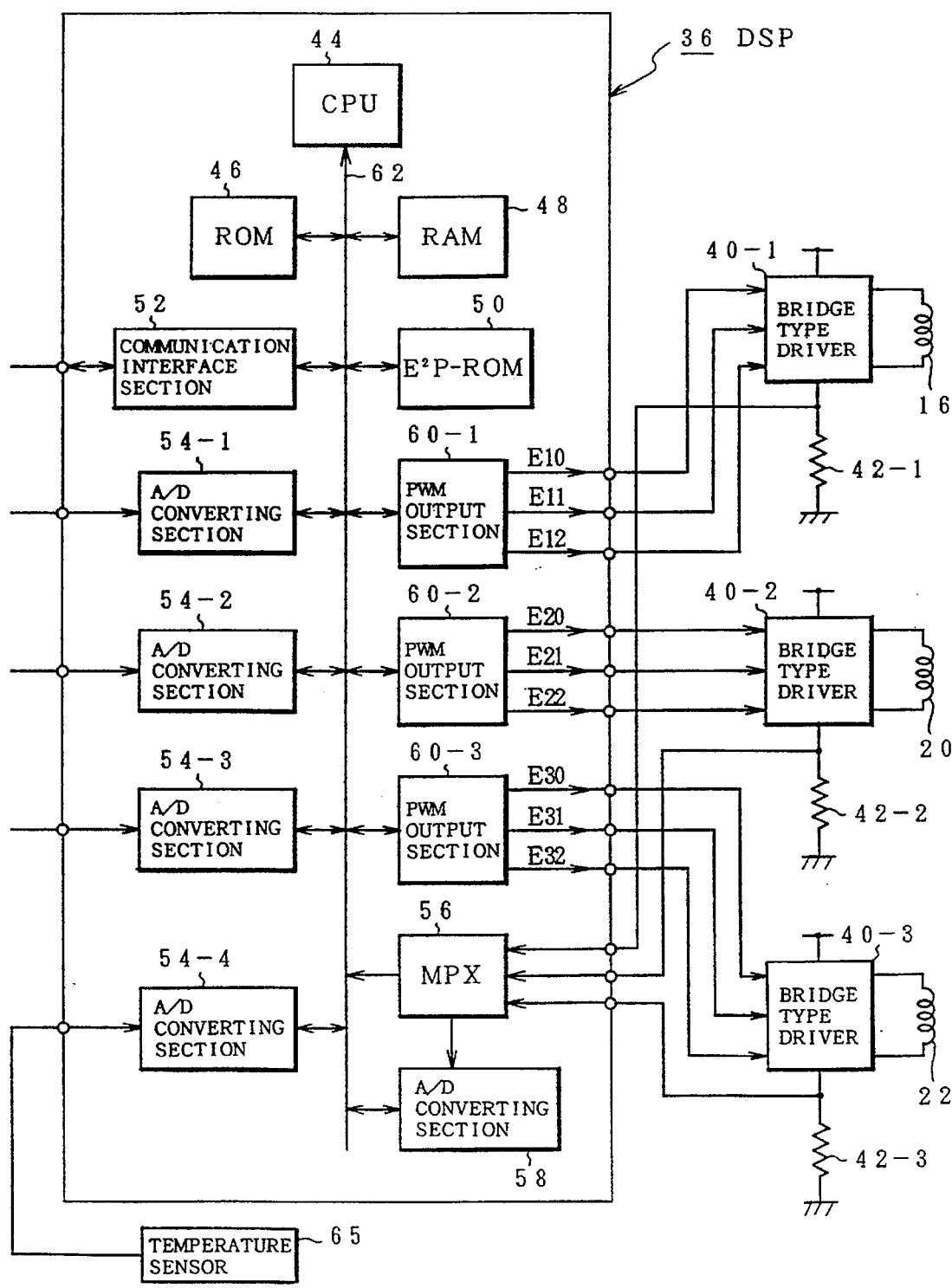
FIG. 6 is a block diagram of a digital signal processor in FIG. 5.

FIG. 6 shows a hardware construction of the digital signal processor 36 which is used in the driving apparatus of FIG. 5. A CPU 44 is provided for the DSP 36. An ROM 46 in which programs have been stored, an RAM 48 which is used to temporarily store various information, an EEPROM 50 which functions as a non-volatile memory, and a communication interface section 52 to perform the transmission and reception of signals to/from the upper processor are connected to a bus 62 from the CPU 44. A/D converting sections 54-1 to 54-4 are provided in order to convert an analog signal inputted from outside to a digital signal to be processed by the CPU 44. In the embodiment, an output of the AGC amplifier 30 is connected to the A/D converting section 54-1. An output of the AGC amplifier 32 is connected to the A/D converting section 54-2. An output of the AGC amplifier 34 is connected to the A/D converting section 54-3. Further, a signal line from a temperature sensor 65 provided for the apparatus is connected to the A/D converting section 54-4.

Pulse width modulation output sections (PWM output sections) 60-1, 60-2, and 60-3 are provided to drive the bridge type drivers 40-1, 40-2, and 40-3 provided in the outside by a pulse width modulation. For example, when considering the PWM output section 60-1, signal lines of an enable signal E10, a forward direction drive signal E11, and a reverse direction drive signal E12 are connected to the bridge type driver 40-1 to drive the voice coil motor 16. The same shall also similarly apply to the PWM output sections 60-2 and 60-3 for the bridge type drivers 40-2 and 40-3.

Current detection resistors 42-1, 42-2, and 42-3 are connected to the bridge type drivers 40-1, 40-2, and 40-3, which are used in the invention in order to detect currents which are supplied to loads, respectively. To process detection voltages of the current detection resistors 42-1, 42-2, and 42-3, an A/D converter 58 having a multiplexer 56 is provided for the DSP 36. The detection voltages of the current detection resistors 42-1 to 42-3 are inputted to the input terminals of the multiplexer 56. When it is necessary to process the detection voltages, the CPU 44 sequentially switches the multiplexer 56, and an output signal of the multiplexer 56 is converted into a digital signal by the A/D converter 58. Although the DSP 36 in FIG. 6 has been shown and described with respect to the case where four A/D converting sections and three pulse width modulation output sections are provided, the number of A/D converting sections and the number of PWM output sections may be set to arbitrary numbers as necessary.

Figure 7:
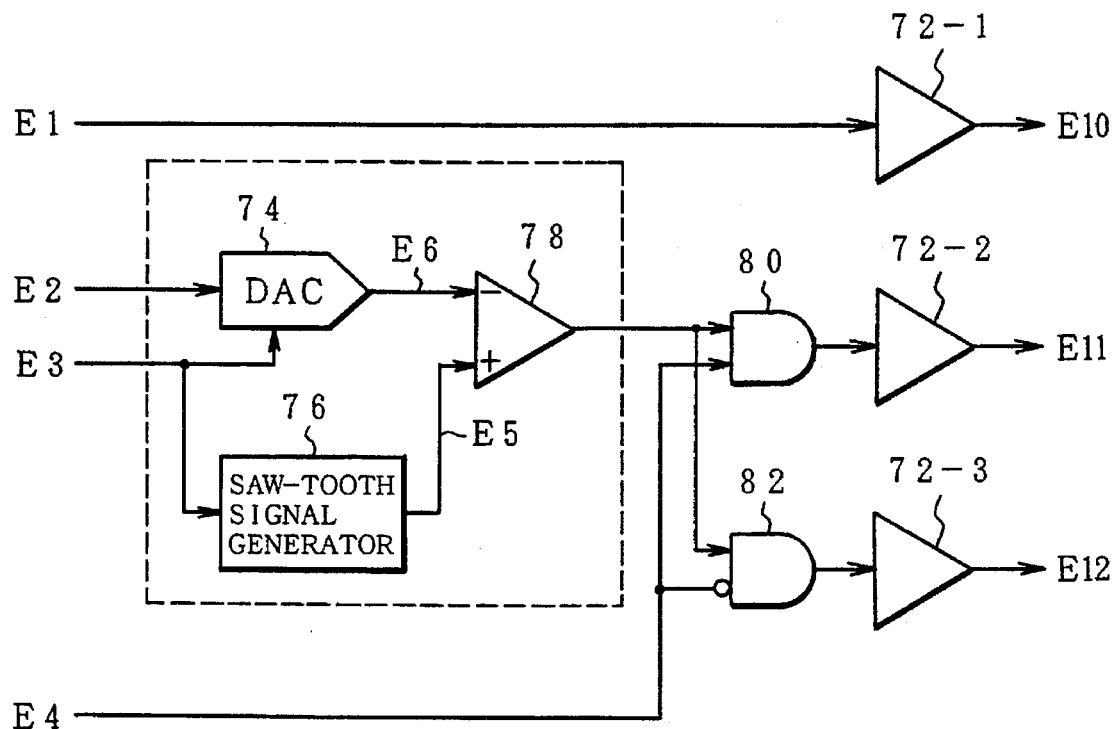
FIG. 7 is a block diagram of an embodiment of a pulse width modulation output section in FIG. 5.

FIG. 7 shows an example of the pulse width modulation output sections 60-1 to 60-3 built in the digital signal processor 36 in FIG. 6. FIG. 7 shows the PWM output section 60-1 in FIG. 6 as a representative, and shows the case of forming the drive signal by an analog process as an example.

In FIG. 7, the forward direction PWM signal E1 from the CPU 44 is converted by a driver 72-1, and is outputted as an enable signal E10 to the outside. The current instruction data signal E2 from the CPU 44 to the voice coil motor 16 based on a servo control is converted to an analog voltage signal E6 by a D/A converter 74, and is supplied to a plus input terminal of a comparator 78. A saw-tooth signal E5 generated synchronously with a clock signal E3 of a predetermined period from a saw-tooth generator 76 is inputted to a minus input terminal of the comparator 78. The comparator 78 compares the instruction voltage signal E6 corresponding to the current instruction data from the D/A converter 74 and the saw-tooth signal E5 from the saw-tooth generator 76 and generates a PWM pulse having a duty ratio corresponding to the current instruction data.

Figure 8:
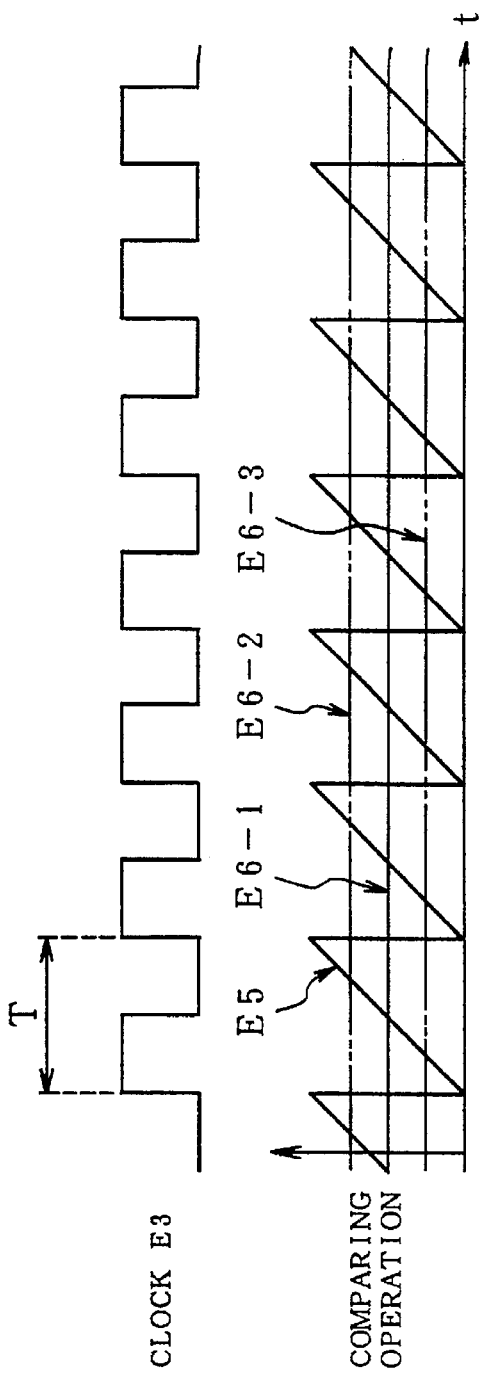
FIGS. 8A to 8E are timing charts for a pulse width modulating operation in FIG. 7.

FIGS. 8A to 8E show generating operations of PWM pulses in FIG. 7. The clock signal E3 of FIG. 8A is repetitively generated at a predetermined period T. The saw-tooth signal E5 in FIG. 8B is generated synchronously with the clock signal E3. It is now assumed that the voltage signal E6 corresponding to the instruction current value from the D/A converter 74 is a signal E6-1 of a solid line. The comparator 78 to which the saw-tooth signal E5 and voltage signal E6-1 were inputted generates a PWM pulse of FIG. 8C which is set to the H level for a period of time during which the level of the voltage signal E6-1 is higher than that of the saw-tooth signal E5 and is set to the L level when the level of the saw-tooth signal E5 is higher than that of the voltage signal E6-1. Now, assuming that the voltage signal E6-1 is set to a voltage at a center point, the duty ratio of the PWM pulse of FIG. 8C is equal to 50%. On the other hand, when it is assumed that the current instruction data increases as shown in a voltage signal E6-2 of FIG. 8B, a PWM pulse in which the duty ratio is increased as shown in FIG. 8D is generated. On the contrary, when the current instruction value decreases as shown in a voltage signal E6-3 in FIG. 8B, a PWM pulse in which duty ratio is decreased as shown in FIG. 8E is generated.

Figure 9:
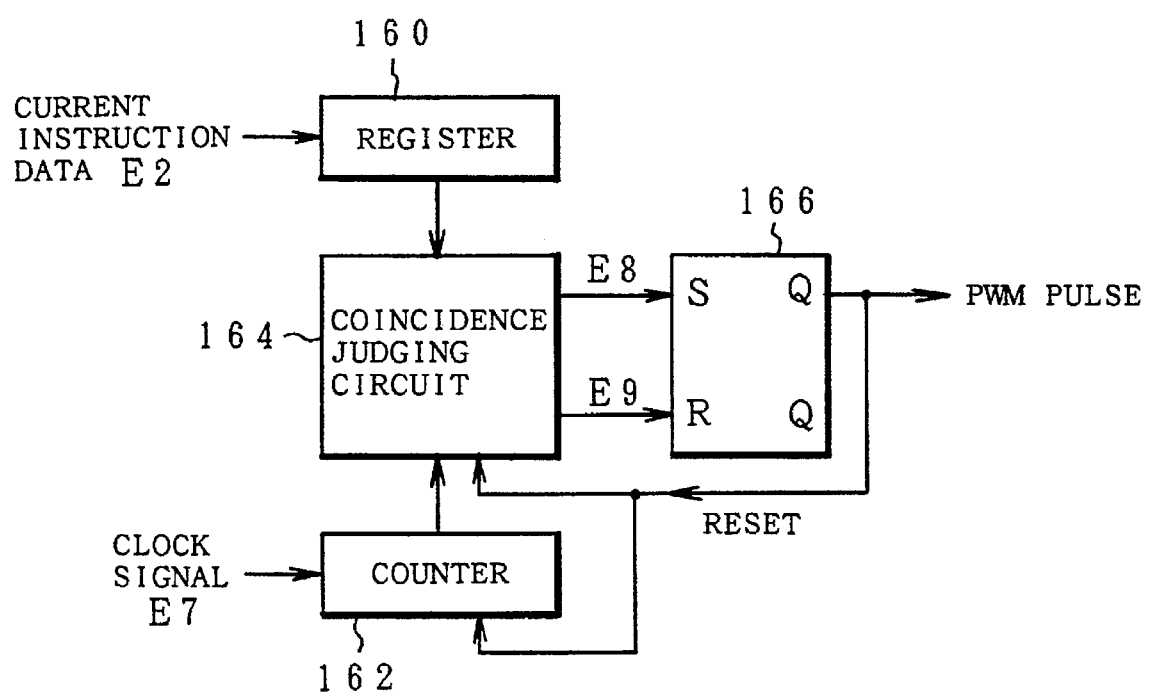
FIG. 9 is a block diagram of another embodiment of the pulse width modulation output section in FIG. 5.

FIG. 9 shows another example of the PWM output sections 60-1 to 60-3 in FIG. 6 and shows the case of digitally generating a PWM pulse as an example. In FIG. 9, the current instruction data E2 from the CPU 44 is held in a register 160. On the other hand, a counter 162 counts the number during clock signals E7 of a predetermined period. A coincidence judging circuit 164 outputs a set signal E8 to an RS-FF 166 each time a count value of the counter 162 coincides with a predetermined pulse period. The circuit 164 outputs a reset signal E9 to the RS-FF 166 each time the count value of the counter 162 coincides with the value held in the register 160. The RS-FF 166 is set by the set signal E8 from the coincidence judging circuit 164 and sets a Q output to the H level. The RS-FF 166 is reset by the reset signal E9 and sets the Q output to the L level. A PWM pulse is generated as a Q output. The Q output is returned to the counter 162 and coincidence judging circuit 164, thereby performing a resetting operation every predetermined pulse period.

Figure 1:
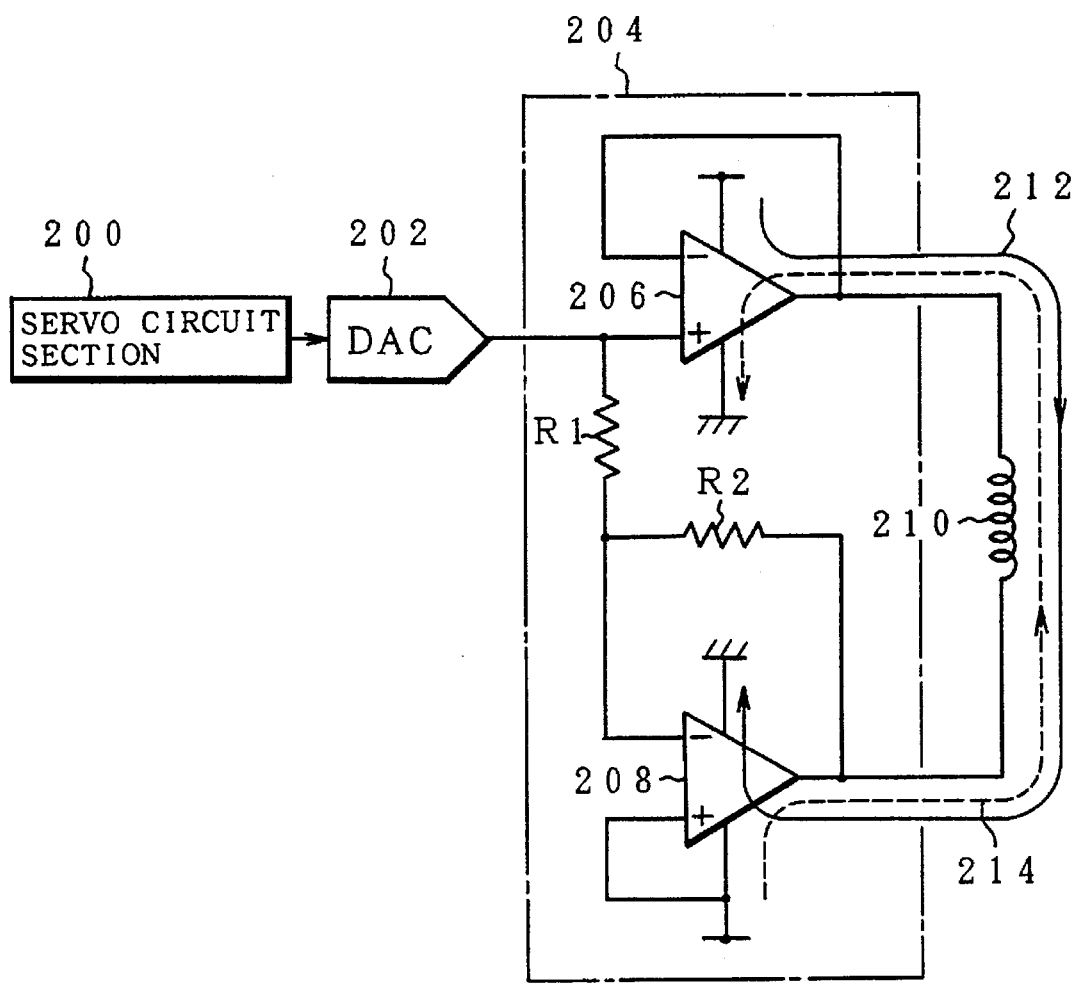
FIG. 1 is a circuit diagram of a power amplifier of a conventional voltage driving type.
Figure 2:
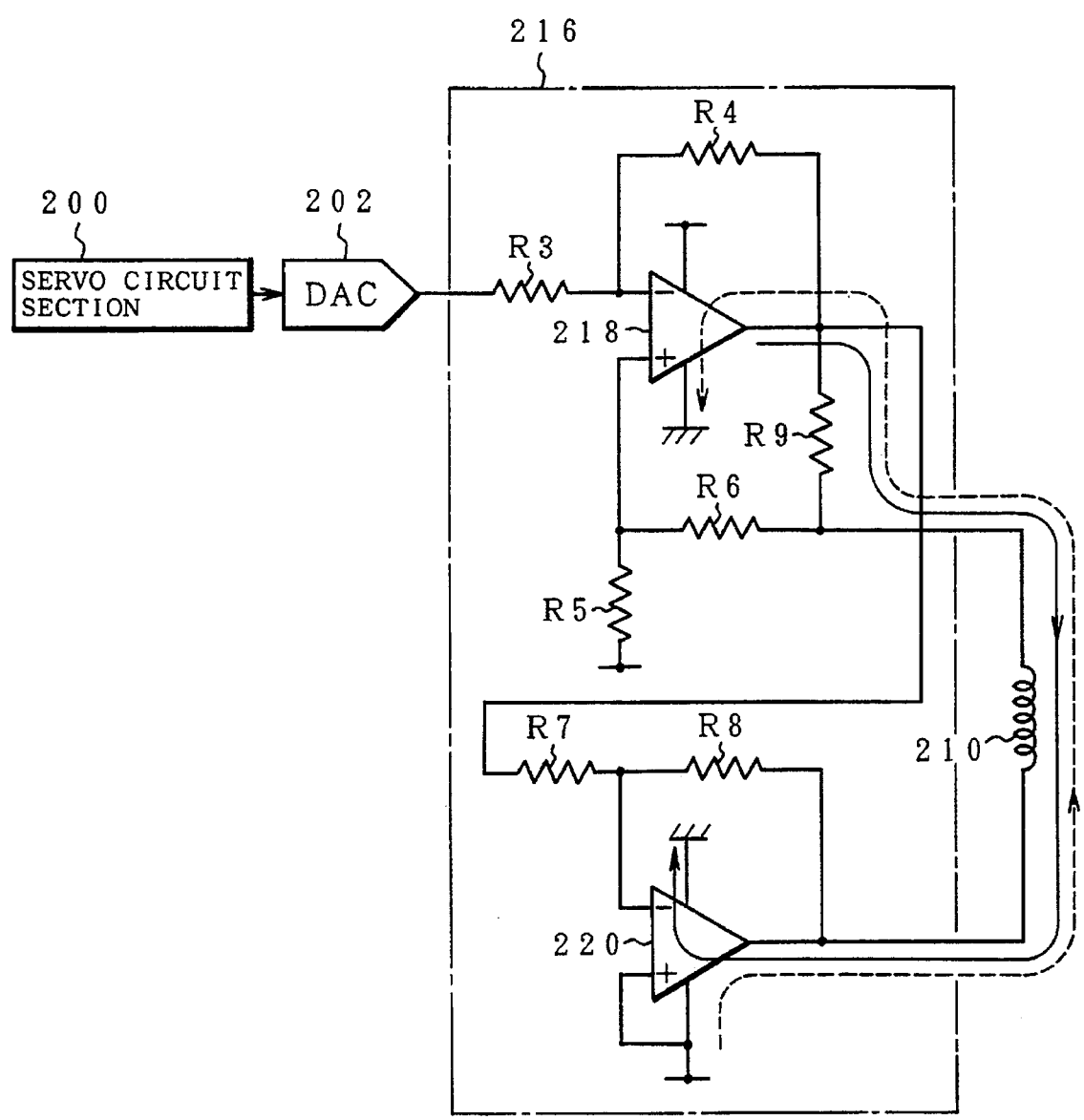
FIG. 2 is a circuit diagram of a power amplifier of a conventional current driving type.
Figure 3:
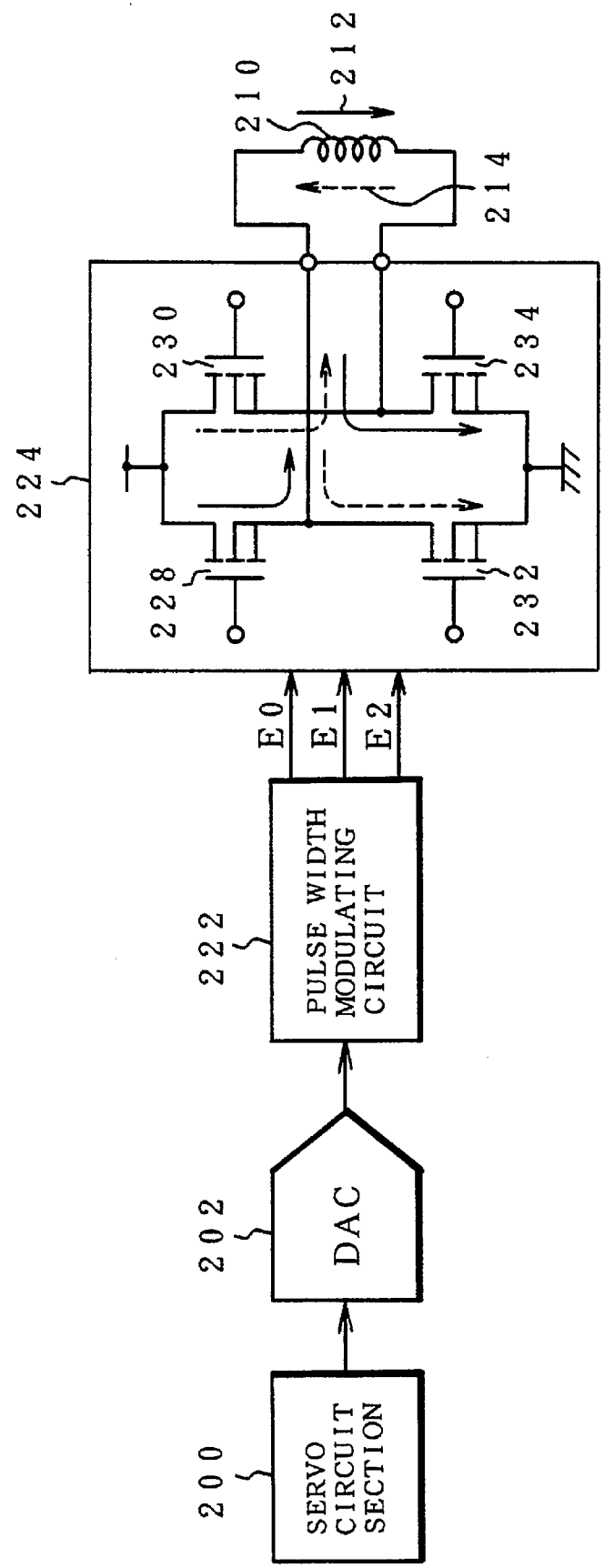
FIG. 3 is a circuit diagram of a power amplifier of a conventional pulse width modulation driving type.
Figure 4:
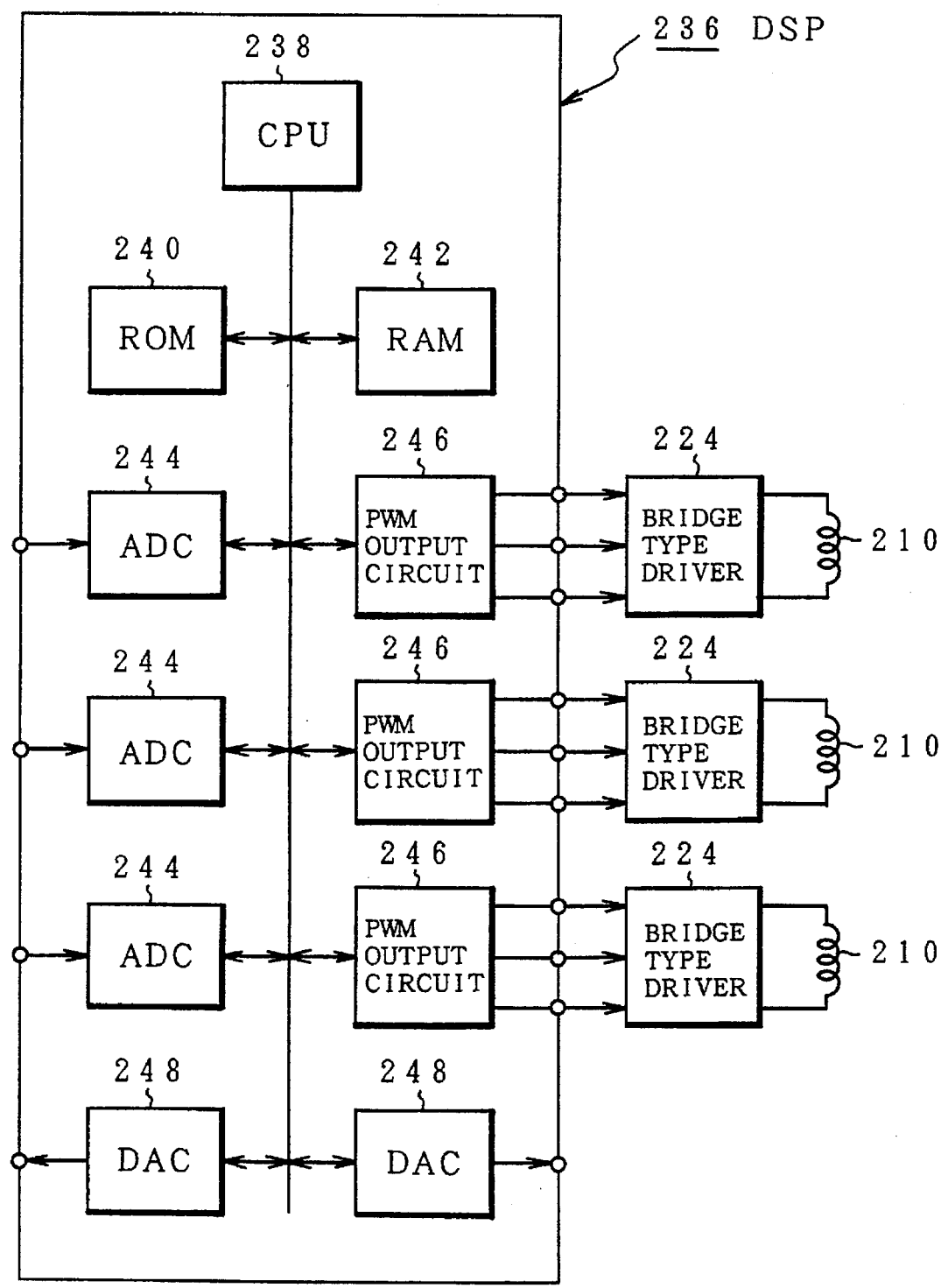
FIG. 4 is a block diagram of a conventional apparatus using a digital signal processor.
Figure 10:
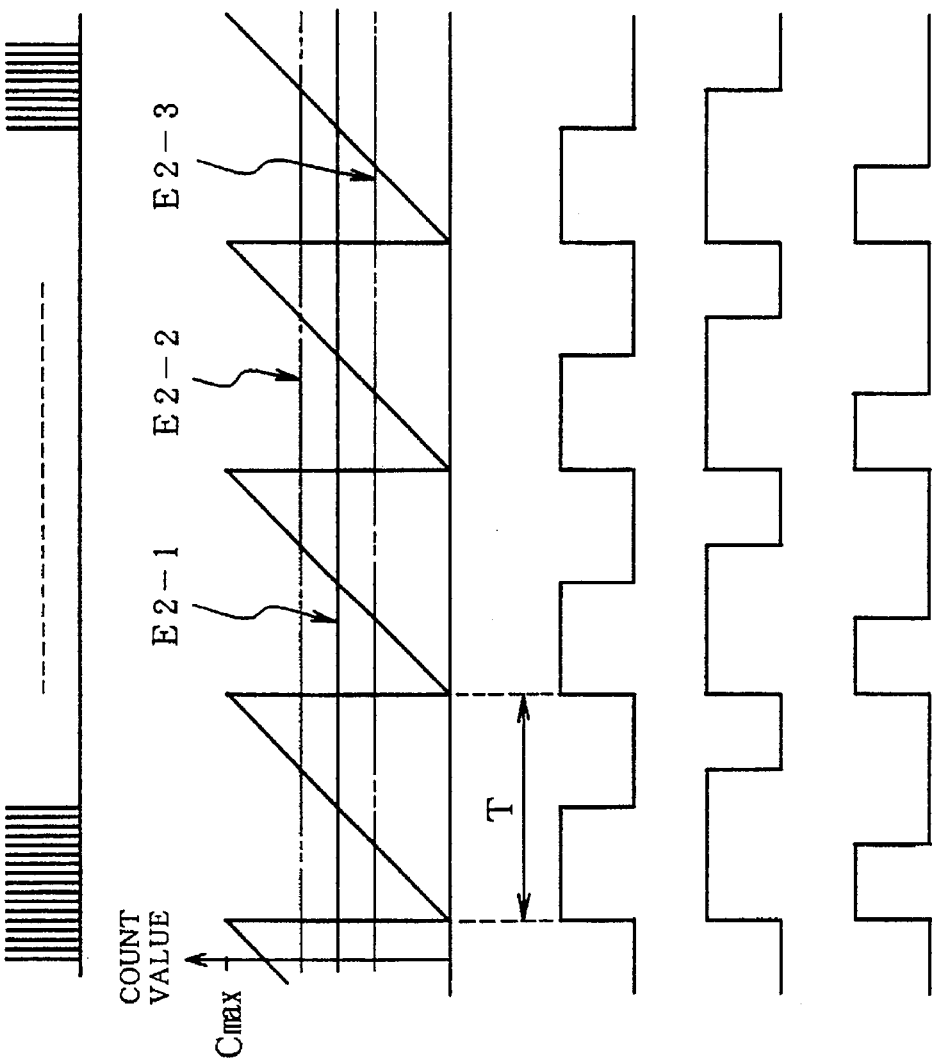
FIGS. 10A to 10E are timing charts for the pulse width modulating operation in FIG. 9.

FIGS. 10A to 10E show generating operations of the PWM pulse according to FIG. 9. The clock signal E7 in FIG. 10A is a signal having a clock period that is sufficiently shorter than the pulse period of the PWM pulse. The counter 162 counts the clock signal E7 and the change of the count value in FIG. 10B is repeated at the pulse period T. On the other hand, the current instruction data E2 at that time is set into the register 160. For example, now assuming that current instruction data E2-1 shown by a solid line has been set, the RS-FF 166 is set at the pulse period T. Subsequently, the RS-FF 166 is reset to a timing when the count value coincides with the current instruction data E2-1. Therefore, a PWM pulse in FIG. 10C is generated. According to the PWM pulse, the current instruction data E2-1 is the center point data, so that the duty ratio is equal to 50%. In the case where the current instruction value is increased as shown in current instruction data E2-2 in FIG. 10B, a PWM pulse in which the duty ratio is smaller than 50% as shown in FIG. 10D is generated. Further, when the current instruction value decreases like current instruction data E2-3 in FIG. 10B, a PWM pulse in which the duty ratio is smaller than 50% in FIG. 10E is generated. A system for generating the PWM pulse having a duty ratio based on the current instruction data is not limited to the analog system of FIG. 4 or the digital signal system of FIG. 9, but a proper circuit construction can be used.

Referring again to FIG. 7, AND circuits 80 and 82 are provided after the comparator 78 to form the PWM pulse. The PWM pulse from the comparator 78 is inputted to the AND circuits 80 and 82. A direction judgement signal E4 from the CPU 44 is inputted to another input of each of the AND circuits 80 and 82. An inverted input of the direction judging signal E4 is inputted to the AND circuit 82. The direction judging signal E4 is set to the H level when driving in the forward direction and sets the AND circuit 80 into a permission state. Thus, the PWM pulse from the comparator 78 is supplied to a driver 72-2 and is outputted to the outside as a drive signal Eli in the forward direction. In case of the reverse direction, the direction judging signal E4 is set to the L level. In this instance, the AND circuit 82 is set into the permission state and the PWM pulse from the comparator 78 is supplied to a driver 72-3 and is outputted to the outside as a reverse direction drive signal E12. A circuit section of the AND circuits 80 and 82 and drivers 72-1 to 72-3 is also similarly provided with respect to the digital system of FIG. 9.

Figure 11:
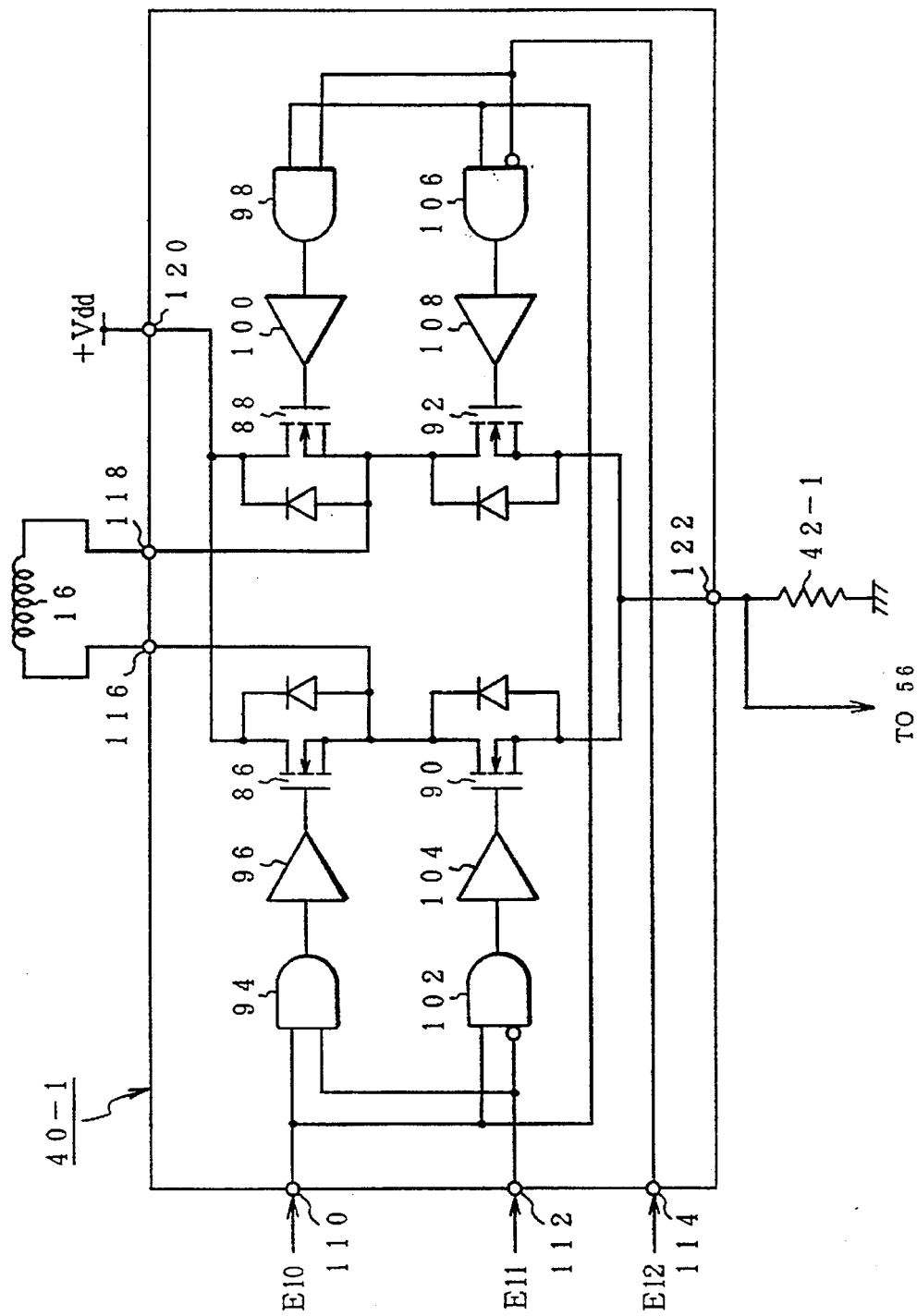
FIG. 11 is a circuit block diagram of an embodiment of the bridge type driver in FIG. 5.

FIG. 11 shows an embodiment of the bridge type drivers 40-1 to 40-3 which are provided as external circuits of the DSP 36 in FIG. 6. The bridge type driver 40-1 used to drive the voice coil motor 16 is shown as an example in this instance. The bridge type driver 40-1 has: an input terminal 110 to input the enable signal E10; an input terminal 112 to input the forward direction drive signal E11; an input terminal 114 to input the reverse direction drive signal E12; output terminals 116 and 118 to connect the voice coil motor 16; a power source terminal 120 to supply a power source; and a current detecting terminal 122 to connect the current detection resistor 42-1. A bridge circuit having four FETs 86, 88, 90, and 92 is provided in the bridge type driver 40-1. Namely, the FETs 86 and 90 are serially connected, the FETs 88 and 92 are serially connected, and those serial circuits are connected in parallel and are connected between power source lines. A node between the FETs 86 and 90 is led out to the output terminal 116. A node between the FETs 88 and 92 is led out to the output terminal 118. An AND circuit 94 and a driver 96 are provided on the gate side of the FET 86. An AND circuit 98 and a driver 100 are also provided on the gate side of the FET 88. An AND circuit 102 in which one input is set to an inverting input and a driver 104 are provided on the gate side of the FET 90. An AND circuit 106 in which one input is set to an inverting input and a driver 108 are also similarly provided on the gate side of the FET 92. The enable signal E10 from the input terminal 110 is supplied to one of the inputs of the AND circuits 94, 98, 102, and 106. Therefore, when the enable signal E10 is set to the H level, all of the AND circuits 94, 98, 102, and 106 are set to a permission state. The forward direction drive signal E11 is supplied to another input of the AND circuit 94 and the inverting input of the AND circuit 102. The reverse direction drive signal E12 is supplied to another input of the AND circuit 98 and an inverting input of the AND circuit 106. Therefore, in a state in which the enable signal E10 is set to the H level, when the PWM pulse is supplied to the forward direction drive signal E10 and is set to the H level only for a period of time corresponding to the duty ratio, the AND circuit 94 outputs an H-level, thereby turning on the FET 86 by the driver 96. In this instance, since the reverse direction drive signal E12 is at the L level, the AND circuit 106 outputs an H-level signal and the FET 92 is simultaneously held in the ON state by the driver 108. Therefore, the FET 86 is turned on/off by the PWM pulse as a forward direction drive signal E11. Thus, a drive current flows along a path from a power source +Vdd through the FET 86, voice coil motor 16, and FET 92 to, further, the external current detection resistor 42-1 in accordance with the duty ratio. On the other hand, when the PWM pulse is supplied as a reverse direction drive signal E12, the FET 88 is turned on/off by the AND circuit 98 and driver 100. In this instance, since the forward direction drive signal E11 is at the L level, the FET 90 is turned on by the AND circuit 102 and the driver 104. Therefore, the FET 88 is turned on/off by the PWM pulse as a reverse direction drive signal E12. A drive current flows in the reverse direction along a path from the power source +Vdd through the FET 88, voice coil motor 16, and FET 90 to the current detection resistor 42-1 externally connected. As a bridge type driver in FIG. 11, for example, L6202 "0.3Ω DMOS FULL BRIDGE DRIVER" made by SGS-THOMSON Co., Ltd. can be used.

Figure 12:
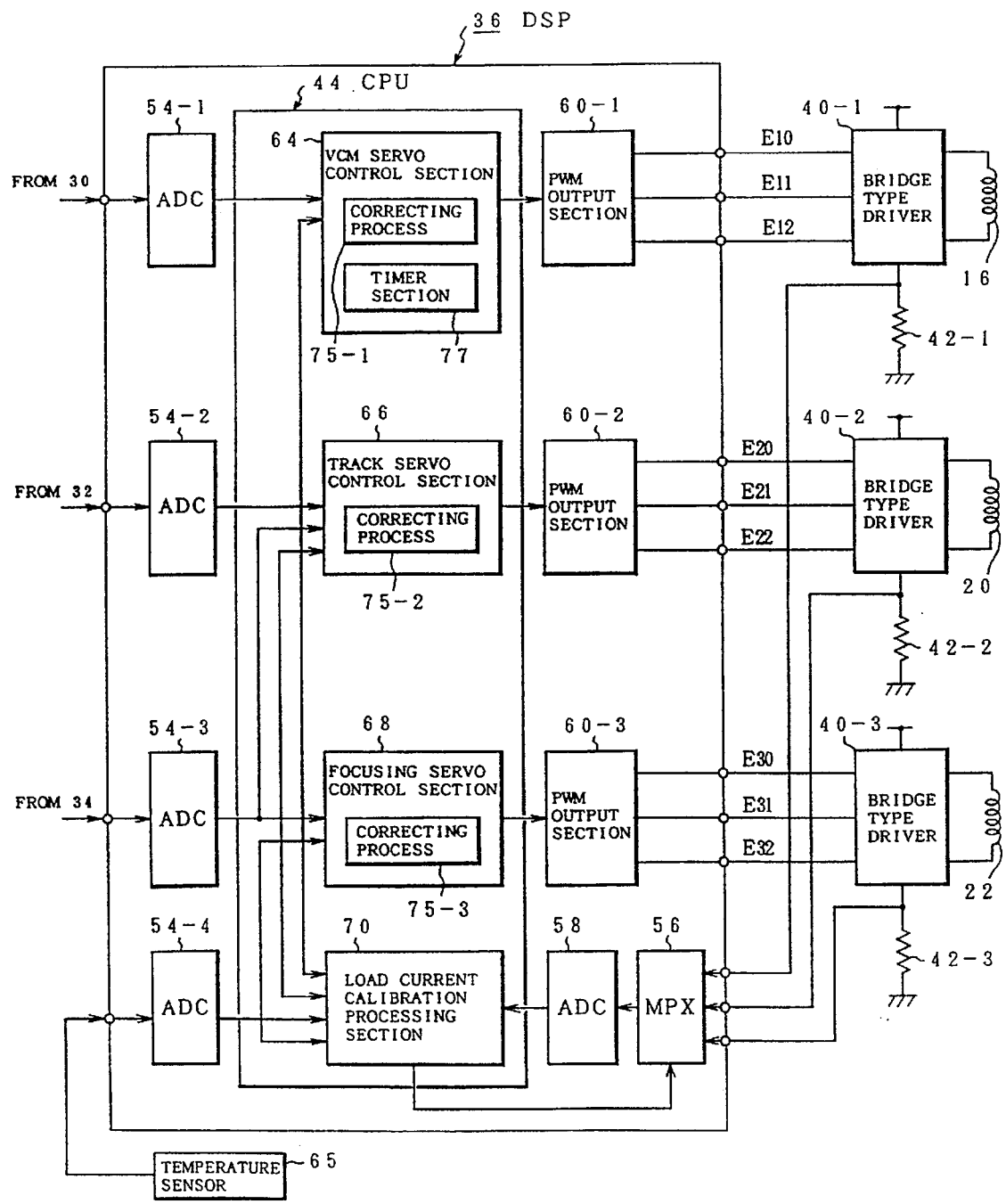
FIG. 12 is a block diagram of a functional construction of the invention.

FIG. 12 shows driving functions of the invention which are realized by a program control of the CPU 44 of the digital signal processor 36 shown in FIG. 6. Functions of a VCM servo control section 64, a tracking servo control section 66, and a focusing servo control section 68 are realized by the CPU 44 provided for the digital signal processor 36. A load current calibration processing section 70 is provided to realize high precision similar to that of the current driving type even when the pulse width modulation output sections 60-1 to 60-3 of the voltage driving type are used. Further, correction processing sections 75-1, 75-2, and 75-3 to correct the current instruction value by using a correction coefficient obtained by the load current calibration processing section 70 are provided for the VCM servo control section 64, tracking servo control section 66, and focusing servo control section 68, respectively. A timer section 77 is provided as a scheduling section and instructs the start of a calibrating process by a timer interruption after completion of the initialization of the load current calibration processing section 70. Further, in a multi-channel control by the digital signal processor 36, a spindle motor, a disk loading mechanism, a bias magnet, and the like other than the coil driving system are also included.

Figure 13:
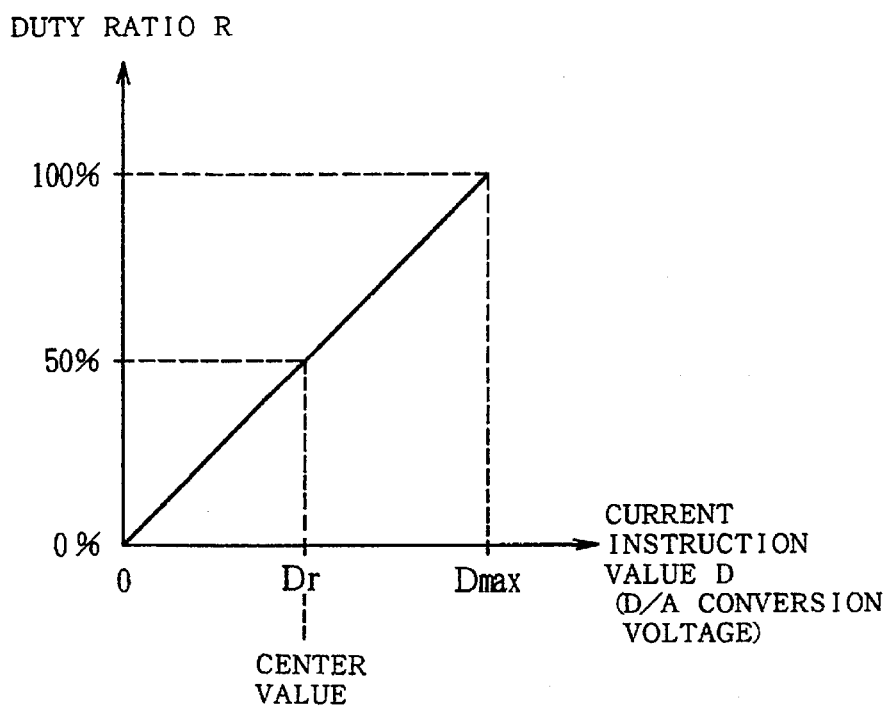
FIG. 13 is a characteristics diagram of the relationship between current instruction value and duty ratio.

Processing functions of the load current calibration processing section 70 provided for the DSP 36 will now be described. FIG. 13 shows the relationship between a current instruction value D which is instructed from the servo control section and the duty ratio R of the PWM pulse by the PWM output section based on the current instruction value D. Now, assuming that the current instruction value D from the servo control section lies within a range from 0 to Dmax, the duty ratio of the PWM pulse linearly changes in a range from 0 to 100% in correspondence to it. The load current calibration processing section 70 in FIG. 12 sets, for example, a center value of the current instruction value D to a reference current instruction value Dr for supplying a reference current to a load for the purpose of verification in a calibrating mode. Therefore, by instructing the reference current instruction value Dr in order to verify the load current in the calibrating mode, the PWM pulse having a duty ratio of 50% can be outputted.

Figure 14:
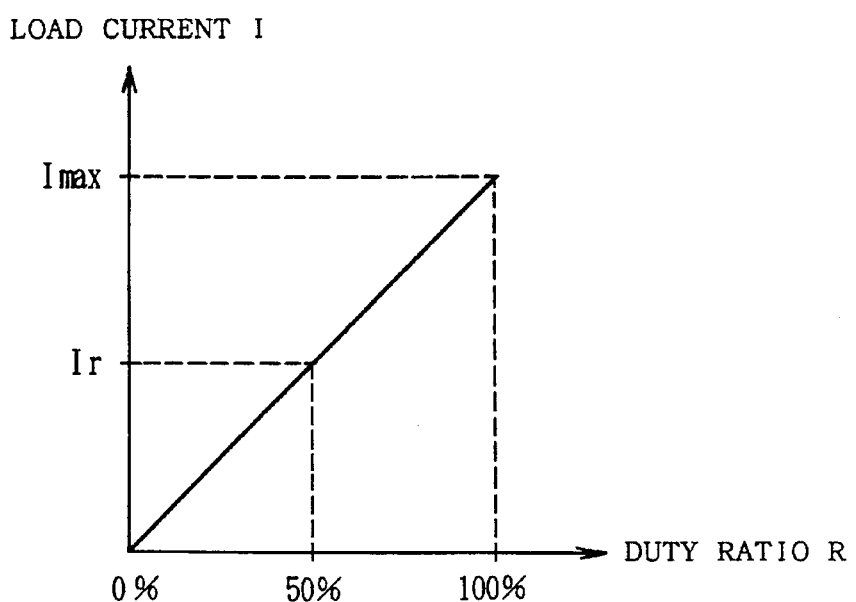
FIG. 14 is a characteristics diagram of the relationship between duty ratio and load current.

FIG. 14 shows the relationship of the load current I to the duty ratio R of the PWM pulse. In this instance, FIG. 14 shows the case where the load current I is set to a range from 0 to Imax and is made to linearly correspond to a range from 0 to 100% of the PWM pulse. For the reference current instruction value Dr as a center value in the calibrating mode, the PWM pulse having a duty ratio of 50% is generated, so that a reference load current Ir ideally ought to be obtained unless there are fluctuations in load resistance and power source voltages. Therefore, the presence or absence of the fluctuation of the servo gain due to the temperature or power source fluctuation can be recognized by checking whether the load current when the PWM pulse of the duty ratio of 50% that is outputted coincides with the reference load current Ir or not.

Figure 15:
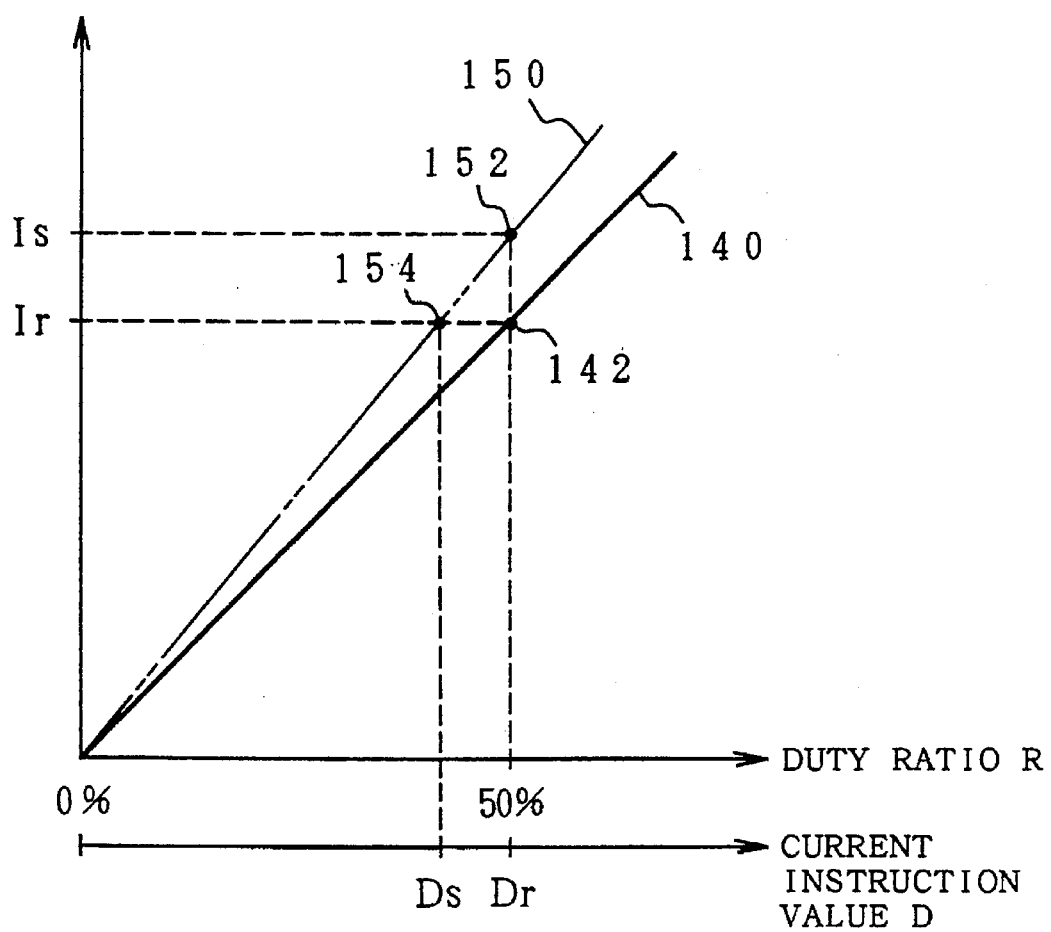
FIG. 15 is a characteristics diagram of a calibrating process in the invention.

FIG. 15 shows a process of a calibration value, in which the abscissa axis denotes the current instruction value D and duty ratio R and the ordinate axis indicates the load current I. When it is now assumed that the reference current instruction value Dr was supplied to the pulse width modulation output section for the purpose of calibration, the PWM pulse of the duty ratio R of 50% is outputted. In this instance, if a resistance of the load and the power source voltage have prescribed values, the reference load current Ir corresponding to an operation point 142 is obtained in accordance with ideal characteristics 140. However, actually, there is a case where the reference load current Ir cannot be obtained due to temperature change or power source fluctuation. For instance, it is now assumed that a load current Is is higher than the reference current value Ir is obtained by the PWM pulse of the duty ratio of 50%. In this case, the ideal characteristics 140 are not obtained, but the characteristics change to real characteristics 150 having an operation point 152. Therefore, in the real characteristics 150, the load current I according to the ideal characteristics 140 is not obtained at the duty ratio R based on the current instruction value and the servo gain differs from the prescribed value. In such a case, according to the invention, the current instruction value D is adjusted so as to increase or decrease around the reference current instruction value Dr of the duty ratio of 50% as a center, thereby obtaining a current instruction value at which a load current that coincides with the reference current value Ir is derived.

In case of FIG. 15, the load current Is for the duty ratio of 50% increases more than the reference current Ir. Therefore, to reduce the duty ratio R, the current instruction value is also sequentially decreased from the reference current instruction value Dr. A current instruction value Ds is obtained when the load current coincides with the reference current Ir at an operation point 154 in the real characteristics 150. When the current instruction value Ds that coincides with the reference current value Ir is obtained as mentioned above, a correction coefficient K is obtained as $$K = Ds/Dr$$

When the correction coefficient K is obtained by multiplying the correction coefficient K to the reference current instruction value Dr, the current instruction value is equal to Ds. Therefore, a load current that coincides with the reference current value Ir according to ideal characteristics 140 can be obtained by the output of the PWM pulse having the duty ratio of the corrected current instruction value Ds.

Figure 16:
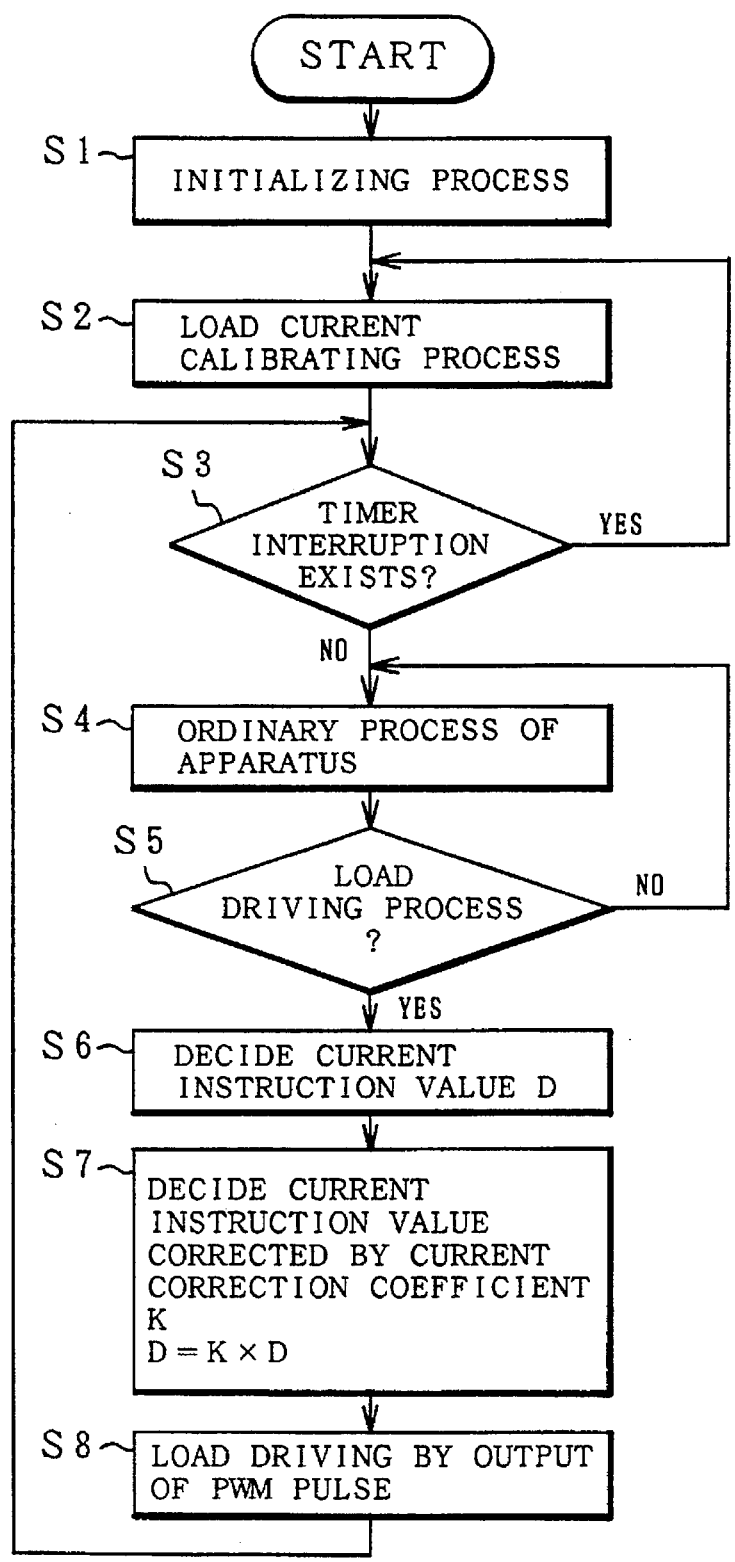
FIG. 16 is a flowchart for the driving process of the invention.

A flowchart of FIG. 16 shows an overall processing operation including a process by the load current calibration processing section 70 in FIG. 12 and correcting processes by the correction processing sections 75-1 to 75-3 provided for the servo control sections. When the power source of the apparatus is first turned on, in step S1, the DSP 36 executes a predetermined initializing process. When the initializing process is finished, step S2 follows and the load current calibration processing section 70 is activated and a calibrating process of the load current is executed. The calibrating process of the load current is sequentially executed for every servo system, so that the correction coefficient K that is used in the correction processing sections 75-1 to 75-3 is obtained and stored into the EEPROM 50 in FIG. 6. After completion of the calibrating process of the load current in association with a power-on start, step S3 follows. A check is made to see if there is a timer interruption according to a time schedule of the timer section 77 as a scheduling section for activating the calibrating process of the load current during the operation of the apparatus. In step S4, an ordinary process of the apparatus is executed. As a time schedule by the timer section 77, a time schedule by a count according to a predetermined time, an accessing frequency, or the like is formed and a timer interruption is executed. When a driving process of a load is satisfied in an arbitrary servo system in the ordinary process of the apparatus in step S4, the load driving process is judged in step S5. In step S6, the current instruction value D is decided in the servo system which started the process. For the decision of the current instruction value D, the correction processing section provided for the servo system determines the current instruction value corrected by the self correction coefficient K in step S7. In step S8, the decided current instruction value is supplied to the PWM output section and a load driving by an output of the PWM pulse is performed. When a timer interruption for the calibrating process of the load current occurs during the use of the apparatus, the presence or absence of the timer interruption is judged in step S3. The calibrating process of the load current in step S2 is again executed. Thus, the calibrating process of the load current is periodically executed by the timer interruption according to the time schedule.

Figure 17:
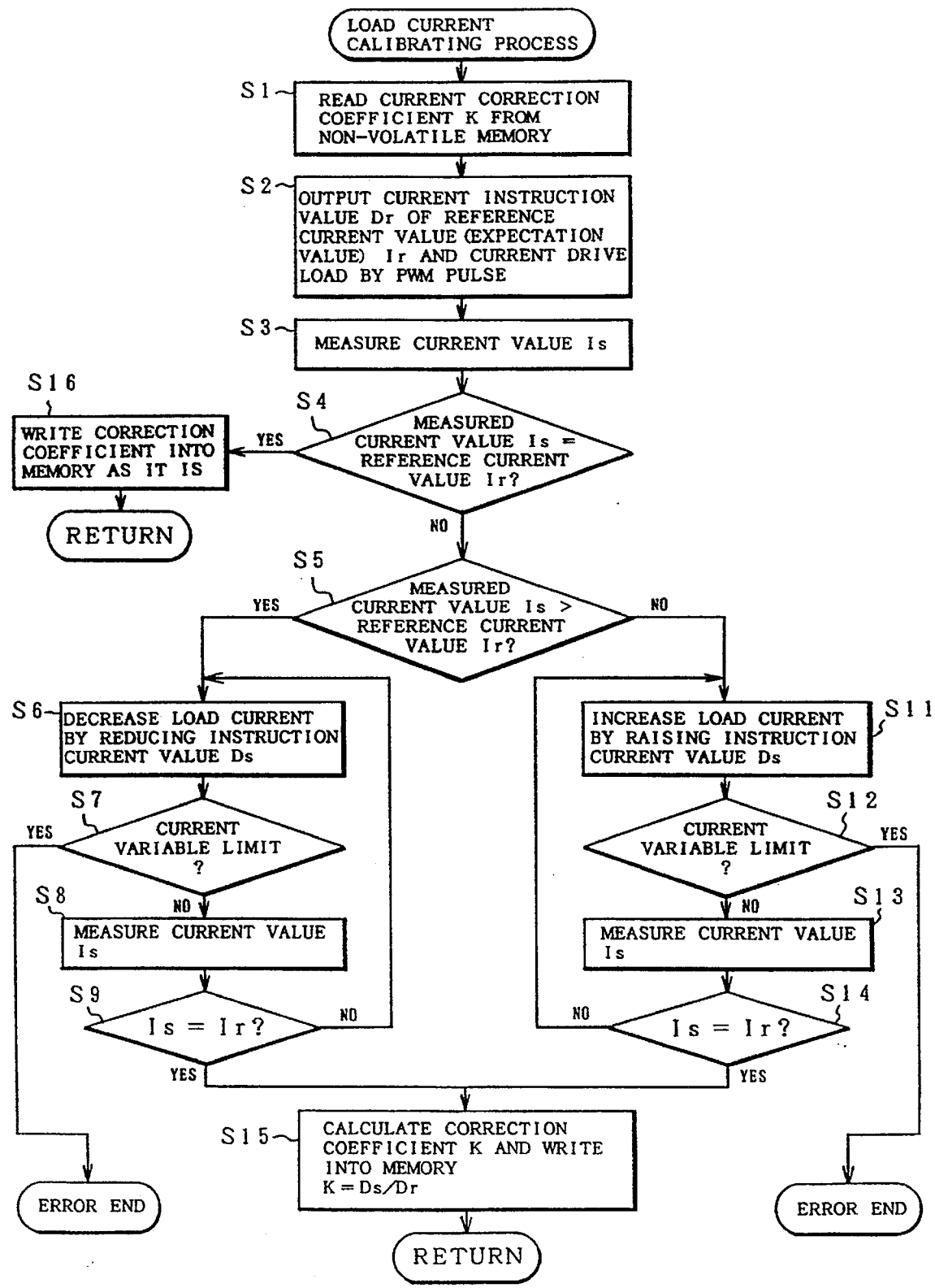
FIG. 17 is a flowchart showing the calibrating process in FIG. 16 as a subroutine.

A flowchart of FIG. 17 shows a detailed subroutine for the calibrating process of the load current in step S2 in FIG. 16. The load current calibration processing section 70 in FIG. 12 is activated and the calibrating process of the load current is started on the basis of the power-on start or the timer interruption of the time schedule. First, in step S1, the current correction coefficient K held at present is read out from the non-volatile memory using the EEPROM 50. The current correction coefficient K is set to K=1 in the initial state. In step S2, the reference current instruction value Dr to obtain the predetermined reference load current Ir is outputted. For example, the load is current driven by the PWM pulse having a duty ratio of 50%. In this state, the current value Is is measured in step S3. Specifically speaking, the detection value of the current detection resistor 42 provided for the bridge type driver of the servo system which is at present performing the calibration is selected by the multiplexer 56. The selected detection value is converted to the digital signal by the A/D converting section 58 and is supplied to the load current calibration processing section 70. In step S4, a check is made to see if the measurement current value Is coincides with the reference current value Ir or not. When they coincide, since there is no need to update the current correction coefficient K, the correction coefficient K is written as it is into the memory in step S16. The processing routine is returned to a main routine of FIG. 14.

When the measurement current value Is does not coincide with the reference current value Ir in step S4, step S5 follows and a check is made to see if the value of Is is larger than the value of Ir or not. When the measurement current value Is is larger than the reference current value Ir, step S6, follows and the reference current instruction value Dr is set to Ds and is decreased by a predetermined step at a time, thereby reducing the load current. Each time the current is reduced by a predetermined step, a check is made in step S7 to see if the current reaches a current variable limit or not. If NO, the current value Is is measured in step S8. In step S9, a check is made to see if the current value Is coincides with the reference current value Ir or not. The processes in steps S6 to S9 are repeated until the measurement current value Is coincides with the reference current value Ir or not. The instruction current value Ds at which the measurement current value Is coincides with the reference current value Ir is obtained as mentioned above. When the reference current value Ds at which the measurement current value Is that coincides with the reference current value Ir is obtained is derived, the processing routine advances to step S15 and the correction coefficient K is calculated and written into the memory. The processing routine is returned to the main routine in FIG. 16.

On the other hand, when the measurement current value Is is smaller than the reference current value Ir in step S5, step S11 follows and the load current is increased while raising the instruction current value Is from the reference current value Dr by a predetermined step at a time. When the load current does not reach the current variable limit in step S2, the current value Is at that time is measured in step S13. In step S14, a check is made to see if the current value Is coincides with the reference current value Ir or not. The processes in steps S11 to S14 are repeated until they coincide. Therefore, the instruction current value Ds at which the current value Is that coincides with the reference current value Ir is obtained can be derived while increasing the instruction current value by the processes in steps S11 to S14. In step S15, the correction coefficient K is finally calculated in step S15 and written into the memory. The processing routine is returned to the main routine.

Figure 18:
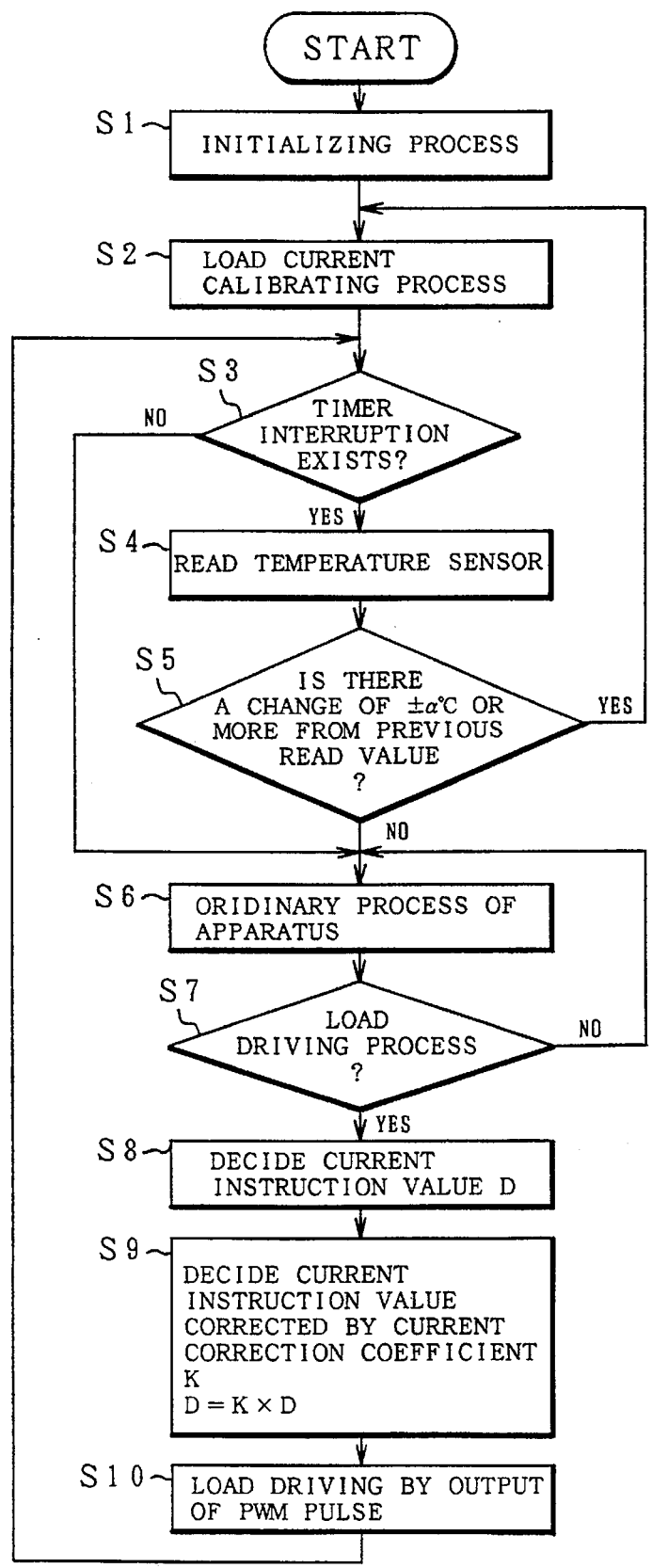
FIG. 18 is a flowchart for another embodiment of the driving process of the invention.

FIG. 18 shows the second embodiment of the calibrating process of a load current by the load current calibration processing section 70 of the present invention. The second embodiment is characterized in that the calibrating process is executed in accordance with a detection temperature of a temperature sensor. First, the initializing process in step S1 at the time of the power-on start and the calibrating process of the load current in step S2 in association with the power-on start are the same as those in FIG. 17. In the ordinary operating state, in step S3, the calibrating process of the load current is executed by a timer interruption based on the time schedule. In the second embodiment, however, when there is the timer interruption in step S3, step S4 follows and a detection temperature of the temperature sensor 65 is read. In step S5, a check is made to see if the present read value has changed by a predetermined range of $\pm\alpha°$ C. or more from the previous read value or not. If YES, since it is presumed that a fluctuation also occurred in the load current, step S2 follows and the calibrating process of the load current is executed. When the temperature change lies within the range of $\pm\alpha°$ C., the calibrating process of the load current is not executed. The calibrating process in association with the load driving in step S6 and subsequent steps is substantially the same as that in case of FIG. 17. By checking a change in ambient temperature at the time of the calibrating process of the load current as mentioned above, the calibrating process is executed only in the case where there is a large temperature change. In a stable state without a temperature change, the calibrating process is made unnecessary, thereby preventing that a processing burden on the digital signal processor increases than it is needed.

In the embodiment of FIG. 18, although the temperature change has been checked on the basis of the timer interruption, it is also possible to construct in a manner such that a check of the temperature change is preferentially performed and, for example, in the case where the temperature changes by the range of $\pm\alpha°$ C. or more by the reading of the temperature sensor at every predetermined period, the load current calibrating process is forcedly executed without waiting for the timer interruption. The timer interruption and the calibrating process of the load current in which the temperature change is judged can be also properly combined as necessary.

As a timer for interruption, a timer built in the CPU or a timer that is externally attached can be used.

Figure 19:
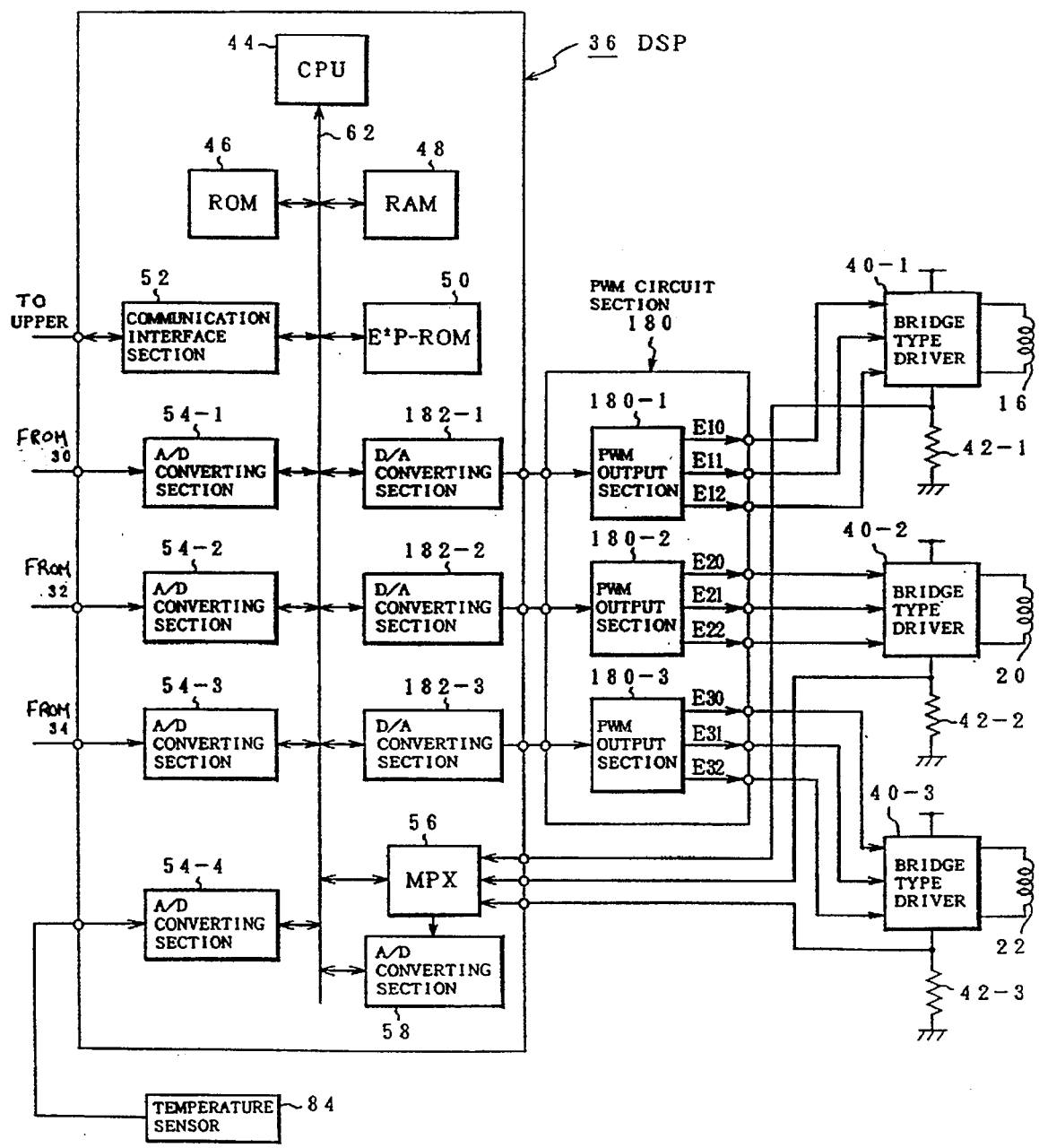
FIG. 19 is a block diagram of another embodiment of the invention.

FIG. 19 shows an embodiment in the case where no pulse width modulation output circuit is built in the digital signal processor. The PWM output sections 60-1 to 60-3 as in the embodiment of FIG. 6 are not built in the DSP 36 in this embodiment. In place of them, the DSP 36 has therein D/A converting sections 182-1 to 182-3. In case of such a DSP 36, a PWM circuit section 180 is provided as an external circuit. Pulse width modulation output circuits 180-1, 180-2, and 180-3 formed as discrete circuits are built in the PWM circuit section 180. For example, circuits for receiving current instruction voltages from the D/A converting sections 182-1 to 182-3 built in the DSP 36 and generating PWM pulses, analog type circuits excluding the D/A converter 74 shown in FIG. 7 can be used as PWM output circuits 180-1 to 180-3. The other construction is substantially the same as the embodiment of FIG. 6. Further, since there is a digital signal processor which does not have therein the A/D converting section 58 with the multiplexer 56, in such a case, it is sufficient to provide the multiplexer 56 as an external circuit.

According to the invention as mentioned above, even in the driving apparatus of the pulse width modulation driving type as a voltage driving type that is easily influenced by the temperature, power source fluctuation, aging change, or the like, high precision similar to that of the driving apparatus of the current driving type can be obtained at low costs by simple circuit construction.

By using the digital signal processor having therein the pulse width modulation circuit section, it is sufficient to merely externally attach the bridge type driver and the current detection resistor of the load. A circuit construction in case of controlling the number of servo mechanisms by the digital signal processor can be remarkably simplified and the costs can be reduced. The efficient and stable servo control can be realized.

By using the digital signal processor having therein the A/D converter with the multiplexer, the calibrating process to obtain the correction coefficient of the current instruction value which is used in each servo system can be executed while sequentially switching the detection value of the load current by the multiplexer. Consequently, an apparatus construction in case of driving a number of servo mechanisms can be also simplified and the costs can be extremely reduced.

Although the above embodiments have been described with respect to the digital signal processor as an example, in the case where the number of servo mechanisms to be controlled is small and there is a surplus in processes, the invention can be also realized by using an ordinary one-chip microprocessor. In case of using the microprocessor, it is desirable that the microprocessor has therein a pulse width modulation output section and an A/D converting section with a multiplexer. Particularly, when an erroneous operation occurs at the time of the tracking servo control and focusing servo control which are significant for recording and reproduction, such an erroneous operation causes an oscillation of the servo system and the processing performance deteriorates. As an advantage that is obtained by applying the invention to the optical disk apparatus, since a high-speed pull-in can be performed according to the invention, a control can be stably performed.

Although the above embodiments have been described with respect to the optical disk apparatus as an example, the invention is not limited to it but can be also applied as it is to another apparatus having servo mechanisms for driving a number of coil loads such as magnetic disk apparatus, compact disk apparatus, and the like. Further, the invention is not limited by the numerical values shown in the embodiments.

What is claimed is:

1. An apparatus for controlling a current of a load by modulating a pulse width of a drive pulse signal, comprising:

control means for outputting a current instruction value to control said load;

pulse width modulating means for inputting a current instruction value of said control means and for forming and outputting a pulse signal of a duty ratio according to said current instruction value;

driving means for current driving said load by an output pulse signal of said pulse width modulating means;

calibrating means, when executing a calibrating process, for outputting a reference current instruction value corresponding to a predetermined reference current of said load to said pulse width modulating means, for measuring a current of said load, and when said measurement current does not coincide with said reference current, for adjusting the current instruction value for said pulse width modulating section, for obtaining a current instruction value at which a measurement current that coincides with said reference current is derived, and for deciding a correction coefficient of the current instruction value from said measurement result; and correcting means for correcting said current instruction value which is outputted from said control means by said correction coefficient obtained by said calibrating means and for outputting to said pulse width modulating means.

2. An apparatus according to claim 1, wherein said calibrating means divides said measurement current instruction value by said reference current instruction value, thereby calculating the correction coefficient.

3. An apparatus according to claim 1, wherein said correcting means outputs the current instruction value obtained by multiplying said correction coefficient to said current instruction value to said pulse width modulating means.

4. An apparatus according to claim 1, wherein said control means, said pulse width modulating means, said calibrating means, and said correcting means are realized by a processor.

5. An apparatus according to claim 4, wherein said processor is a digital signal processor.

6. An apparatus according to claim 4, wherein said processor is a one-chip microprocessor.

7. An apparatus according to claim 4, wherein said processor has therein:

a pulse width modulation output unit corresponding to said pulse width modulating means;

a central processing unit for realizing each of said control means, said calibrating means, and said correcting means by a program control; and an A/D converting unit for fetching a detection value of the current of said load to said central processing unit, and wherein a resistor for detecting the load current that is inputted to said A/D converting unit and said driving means are externally attached as external circuits.

8. An apparatus according to claim 4, wherein said processor has therein:

a central processing unit for realizing each of said control means, said calibrating means, and said correcting means by a program control; and an A/D converting unit for converting a detection value of the current of said load to a digital signal and for supplying to said central processing unit, and wherein a pulse width modulating output unit corresponding to said pulse width modulating means, a resistor for detecting the current of said load that is inputted to said A/D converting unit, and said driving means are externally attached as external circuits.

9. An apparatus according to claim 4, wherein in case of driving a plurality of loads, said processor includes:

pulse width modulation output units of the number corresponding to said plurality of loads;

a selecting unit for selecting one of detection values of said plurality of currents of said loads; and a single A/D converter for converting the detection value selected by said selecting unit to a digital signal, and wherein a process of said calibrating means is executed while selecting the current of said load by said selecting unit.

10. An apparatus according to claim 1, further comprising initializing means for instructing said calibrating means to execute the calibrating process when a power source of the apparatus is turned on.

11. An apparatus according to claim 1, further comprising scheduling means for periodically instructing said calibrating means to execute the calibrating process.

12. An apparatus according to claim 11, further comprising temperature detecting means for measuring an environmental temperature of said apparatus, and wherein when receiving an instruction for the calibrating process, said calibrating means compares a detection temperature of said temperature detecting means and a previous detection temperature and executes the calibrating process when a temperature difference exceeding a predetermined value is judged.

13. A method of controlling a current of a load by modulating a pulse width of a drive pulse signal, comprising:

a measuring step of outputting a reference current instruction value corresponding to a predetermined reference current of said load to a pulse width modulator and measuring a drive current of said load when receiving an instruction of a calibrating process;

an adjusting step of, when a measurement current in said measuring step does not coincide with said reference current, adjusting a current instruction value for said pulse width modulator until said measurement current coincides with said reference current, and obtaining a current instruction value at which the measurement current when they coincide is derived;

a correction coefficient calculating step of deciding a correction coefficient which is obtained by dividing the current instruction value obtained in said adjusting step by said reference current instruction value; and a correcting step of correcting said current instruction value that is outputted from a controller by said correction coefficient and outputting to said pulse width modulator after said correction coefficient was decided.

14. A method according to claim 13, wherein in said correcting step, the current instruction value obtained by multiplying said correction coefficient to said current instruction value is outputted to said pulse width modulator.

15. A method according to claim 13, wherein in said measuring step, in an initializing process at a time of turn-on of an apparatus, an instruction of said calibrating process is received and the calibrating process is executed.

16. A method according to claim 13, wherein in said measuring step, in an operating state of an apparatus, an instruction of said calibrating process is periodically received and the calibrating process is executed.

17. A method according to claim 16, wherein in said measuring step, each time said calibrating instruction is received, an environmental temperature of the apparatus is measured and compared with a previous measurement temperature, and when a temperature difference exceeding a predetermined value is judged, the calibrating process is executed.

* * * * *

UNITED STATES PATENT AND TRADEMARK OFFICE
CERTIFICATE OF CORRECTION

PATENT NO. : 5,631,817
DATED : May 20, 1997
INVENTOR(S) : Akira Minami

It is certified that error appears in the above-identified patent and that said Letters Patent is hereby corrected as shown below:

Column 3, line 37, delete "an".

Column 5, line 24, delete "a" (first occurrence).

Column 5, line 36, delete "a".

Column 6, line 67, delete "the" and insert --each-- therefor.

Column 8, line 48, delete "during clock" and insert --of clock-- therefor.

Column 9, line 32, delete "Eli" and insert --E11-- therefor.

Column 13, line 12, after "follows" insert --,--.

Signed and Sealed this

Sixth Day of October, 1998

*Attest:*

BRUCE LEHMAN

*Attesting Officer*          *Commissioner of Patents and Trademarks*